US010686558B1

(12) United States Patent
Kodaypak et al.

(10) Patent No.: US 10,686,558 B1
(45) Date of Patent: Jun. 16, 2020

(54) FORWARD ERROR CORRECTION ADJUSTMENTS FOR C-V2X COMMUNICATIONS

(71) Applicants: AT&T Intellectual Property I, L.P., Atlanta, GA (US); AT&T Mobility II LLC, Atlanta, GA (US)

(72) Inventors: Rajendra Prasad Kodaypak, Sammamish, WA (US); Sangar Dowlatkhah, Plano, TX (US); Erie Lai Har Lau, Redmond, WA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 0 days.

(21) Appl. No.: 16/285,674

(22) Filed: Feb. 26, 2019

(51) Int. Cl.
| | |
|---|---|
| H04W 4/06 | (2009.01) |
| H04L 1/00 | (2006.01) |
| H04W 8/08 | (2009.01) |
| H04W 4/40 | (2018.01) |

(52) U.S. Cl.
CPC ............ *H04L 1/0061* (2013.01); *H04W 4/06* (2013.01); *H04W 4/40* (2018.02); *H04W 8/08* (2013.01)

(58) Field of Classification Search
CPC ...................................................... H04W 4/06
See application file for complete search history.

(56) References Cited

U.S. PATENT DOCUMENTS

| | | | | |
|---|---|---|---|---|
| 8,917,674 | B2* | 12/2014 | Karaoguz | ............ H04N 19/89 370/329 |
| 2018/0132193 | A1 | 5/2018 | Misener et al. | |
| 2018/0220280 | A1 | 8/2018 | Baghel | |
| 2018/0227802 | A1 | 8/2018 | Lehmann et al. | |
| 2018/0234524 | A1 | 8/2018 | Cheng et al. | |
| 2018/0262367 | A1 | 9/2018 | Alieiev et al. | |
| 2018/0279259 | A1 | 9/2018 | Gulati et al. | |
| 2018/0302770 | A1 | 10/2018 | Bhaskaran et al. | |
| 2018/0324560 | A1 | 11/2018 | Xu et al. | |
| 2018/0332620 | A1 | 11/2018 | Malladi et al. | |

\* cited by examiner

*Primary Examiner* — Sulaiman Nooristany
(74) *Attorney, Agent, or Firm* — Amin, Turocy & Watson, LLP

(57) ABSTRACT

A user equipment (e.g., C-V2X user equipment) can receive a transmission from a network device of a mobile network and decode the transmission using a first forward error correction code. It can determine an attribute of the transmission to determine a condition of the communication channel. Based on the condition of the communication channel, it can facilitate transmitting feedback to the network device, wherein the feedback is forwarded through the mobile network to an application server device that selects a second forward error correction code based on the feedback. The second forward error correction code can be transmitted to, and received by, the user equipment. The user equipment can use the second forward error correction code to decode subsequent transmissions.

20 Claims, 18 Drawing Sheets

FORWARD ERROR CORRECTION ADJUSTMENTS FOR C-V2X COMMUNICATIONS

TECHNICAL FIELD

The present application relates generally to the field of wireless communication and, more specifically, to the selection of a forward error correction code in cellular vehicle-to-everything (C-V2X) communications.

BACKGROUND

Cellular communications technology, including radio access technology, has grown rapidly and evolved since the launch of analog cellular systems in the 1980s, starting from the First Generation (1G) in 1980s, Second Generation (2G) in 1990s, Third Generation (3G) in 2000s, and Fourth Generation (4G) in 2010s (including Long Term Evolution (LTE) and variants of LTE). Additionally, fifth generation (5G) access networks, which can also be referred to as New Radio (NR) access networks, are currently being developed and expected to fulfill the demand for exponentially increasing data traffic, and to handle a very wide range of use cases and requirements, including among others, mobile broadband (MBB) services, enhanced mobile broadband (eMBB) services, and machine type communications (e.g., involving Internet of Things (IOT) devices).

As part of the expansion of the cellular platform for new services, and to keep track with the increasing needs of the automotive industry, functionality of the cellular infrastructure is being developed to provide enhancements specifically for "vehicle-to-everything" (V2X) communications, which can comprise, for example, vehicle-to-vehicle (V2V), vehicle-to-infrastructure (V2I), vehicle-to-network, (V2N) and vehicle-to-pedestrian (V2P) communications. This development of the cellular infrastructure, functionality, and protocols (e.g., standards) for V2X communications is often referred to as cellular V2X (or C-V2X) communications. Vehicle-to-everything (V2X) communication leveraging cellular network infrastructure can provide reliable, actionable information flows with high definition quality services while paving the way for connected and autonomous driving into the near future. The collaboration between automotive and wireless telecommunications technologies is driving the next generation of autonomous vehicular designs. With the initial C-V2X standards developed in 2017, the LTE platform provides a means to offer new services to the automotive industry. LTE and 5G evolution will continue to further drive the C-V2X standardization efforts to meet the increasing needs of the automotive sector with new use cases that can significantly enhance the monitoring and tracking of driver behaviors, and enhance the efficiency as well as safety of intelligent transportation systems. The development and commercialization of C-V2X technology involves multiple stake holders, including carriers, technology providers, automobile original equipment manufacturers (OEMs), and infrastructure vendors, to name some stakeholders, all working together to implement and showcase the benefits and efficiency in the use of this technology for advanced vehicular connectivity and intelligent communications.

Due to its legacy capabilities and a clear roadmap with technology evolution, the 5G automotive association has advocated the use of cellular technologies to redefine and enhance the transportation services connectivity model globally. The first associated standards of C-V2X were introduced in the 3rd Generation Partnership Project (3GPP) standards Release 14. C-V2X technology is expected to drive the evolution of mobility networks and communications that can enable advanced use cases such as autonomous driving, traffic flow optimization, improved safety etc., thus playing a transformative role in connected transportation communications services. LTE-based cellular technologies have enormous potential to drive innovative connectivity services in automotive sector. LTE broadcast enhancements can facilitate vehicle-to-infrastructure (V2I), vehicle-to-vehicle (V2V) and vehicle-to-network (V2N) communications, leveraging traditional cellular networks. While standards-based C-V2X supports a variety of operational modes such as vehicle-to-infrastructure (V2I), vehicle-to-vehicle (V2V) and vehicle-to-network (V2N) communications, such systems and resulting IP multicast/broadcast/unicast services need to be carefully architected to be able to utilize the mobility network infrastructure resources cost-effectively while driving maximum return on investment for operators. These services need to work concurrently with the legacy mobility services to meet the high-performance demands associated with the automotive use cases, as well as have the capability to meet the scale and needs of future use cases leveraging technological advancements. V2I and V2N communications can greatly facilitate smart cities connectivity and control initiatives (ex: traffic, parking, metering updates, cancellations).

The above-described background relating to wireless networks is merely intended to provide a contextual overview of some current issues and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
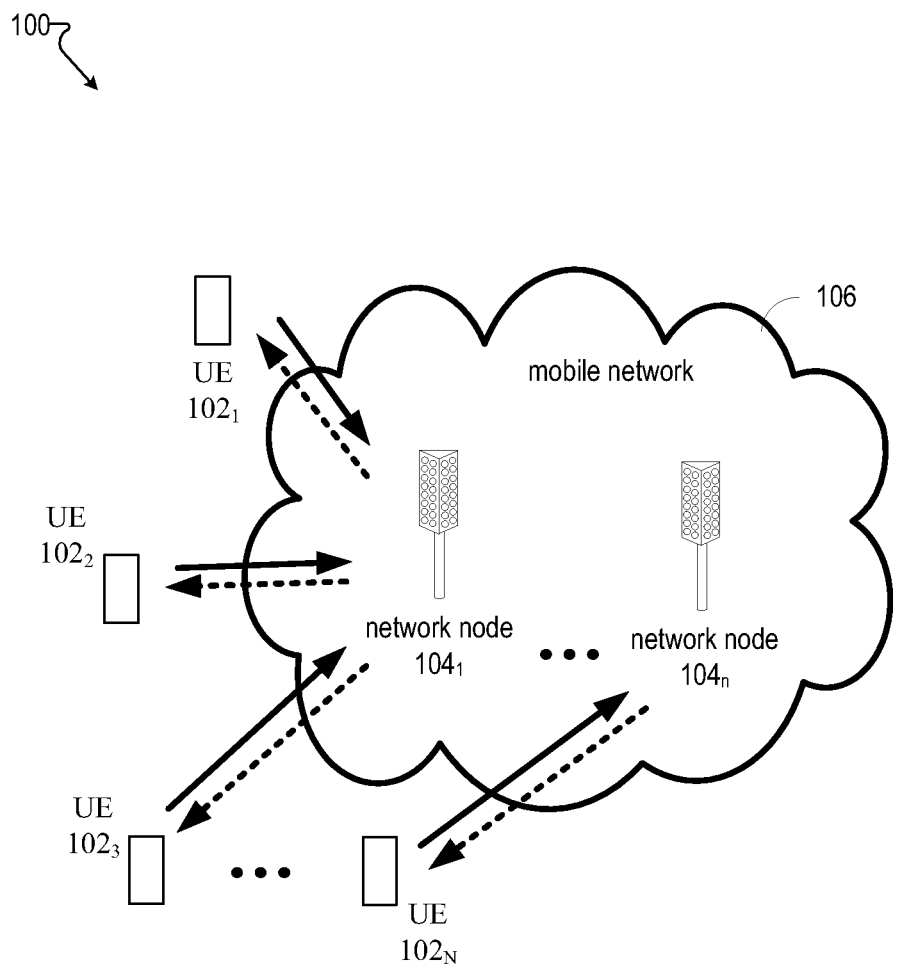
FIG. 1 illustrates an example wireless communication system having a network node device (also referred to herein as a network node) and user equipment (UE), in accordance with various aspects and example embodiments of the subject application.

The subject application is now described with reference to the drawings, wherein like reference numerals are used to refer to like elements throughout. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings. In the following description, for purposes of explanation, numerous specific details are set forth in order to provide a more thorough understanding of the subject application. It may be evident, however, that the subject application can be practiced without these specific details. In other instances, structures and devices are shown in block diagram form to facilitate describing example embodiments.

The methods and operations (e.g., processes and logic flows) described in this specification can be performed by devices (e.g., network management device, gateway device, etc.) comprising programmable processors that execute machine executable instructions (e.g., computer program product, computer-readable instructions, software, software programs, software applications, software modules, etc.) to facilitate performance of the operations described herein. Examples of such devices can be devices comprising circuitry and components as described in FIG. 10.

The cellular industry is striving to develop cellular V2X (C-V2X) technology and is seeking to evolve the cellular carrier's mobility network infrastructure to support advanced software features related to evolved multimedia broadcast multicast services (eMBMS) and next generation new radio technologies to transport efficient unicast as well as multicast user data in switched modes.

The present application relates to the improvement of vehicular connectivity and integrated communications delivery model with a variety of mobile device platforms that can be embedded in the next-generation automotive vehicles.

While standards-based C-V2X supports a variety of operational modes such as vehicle-to-infrastructure (V2I), vehicle-to-vehicle (V2V) and vehicle-to-network (V2N) communications, such systems and resulting IP multicast/broadcast/unicast services need to be carefully architected to be able to utilize the mobility network infrastructure resources cost-effectively while driving maximum return on investment for operators. These services need to work concurrently with the legacy mobility services to meet the high-performance demands associated with the automotive use cases as well as have the capability to meet the scale and needs of future use cases leveraging technological advancements.

The increasing demand of connected cars with embedded multi-mode mobile device platforms to obtain rich communications and navigation capabilities via advanced cellular technologies such as LTE and 5G leads to significant challenges. Connected cars and autonomous driving use cases in smart cities might require high definition graphics intensive map images in real time broadcasted to them with minimal latency and high quality to be able to maneuver accurately enhancing the road safety. In addition, high valued services such as live-streaming, smart parking and important map updates via file downloads should be delivered with high customer satisfaction.

In a traditional broadcast service delivery, devices tuned to receiving broadcasts in a given Multicast Broadcast Single Frequency Network (MBSFN) serving area are often limited in terms of their service quality during mobility based on the dynamics of the correction patterns employed by the LTE modems at the various signal processing layers. While messages can be broadcasted from a plurality of V2X application servers to several automotive vehicles simultaneously in the downstream, the unicast uplink transfers from such vehicles are not impacted. Due to the complex dynamics of the radio conditions, multicasting in a point-to-multipoint environment with bandwidth-limited networks becomes extremely challenging. Specifically, due to the mobility patterns associated with these automotive device platforms when receiving multicast user data across the eMBMS broadcast serving areas, and their corresponding radio environments by virtue of their spectrum allocations, static methods for forward error correction (FEC) in a given broadcast serving area will not suffice in the mobile data transport delivery.

In a typical FEC scheme, redundant packets are generated by an FEC encoder and transmitted along with source packets. As an example, on the transmitter side, a bit string 01 can be encoded into a longer bit string, say 00111. Once the receiver receives the encoded bit string, it uses a decoder to decode the string (00111) into the original source bit string 01. If one of the bits was transmitted in error (e.g., 00111 was transmitted, but resulted in a reception of 00011), the receiver side can still deduce that the source bit string is 01, because the corrupted string 00011 is still more similar to the encoded codeword for 01, which is 00111, than it is to other codewords, such as 00000 or 11110. An even longer codeword, say with eight characters instead of five (e.g., 01100110), while resulting in more bits being transmitted, provides for more bits to enable a detection of an error. Compared with the automatic repeat request (ARQ), which retransmits lost data using an acknowledgement process, FEC is usually preferred for real-time video applications due to lower end-to-end delay.

However, FEC methods at the physical layer and/or application layers that have been applied for point-to-point links will not work uniformly for live streaming and file downloads in a multicast transport scenario. With the static FEC methods, wherein the FEC rate in a given region has been pre-determined at the head-end based on certain network design assumptions, the end user broadcast data services quality could be impacted with mobility between serving areas. In a traffic congested cell, the situation becomes worse with mobility when there is no means to adapt the network functions via suitable interactions between radio access and core network nodes. These static FEC methods do not provide a means for operators to achieve the best return on investment for their scarce spectrum and overall network resources investments.

To alleviate such limitations associated with static mapping of FEC in a geo-fenced serving area pre-provisioned at the broadcast core network head-end, and to provide enhanced end user C-V2X service level experience in connected smart-cars and drive widespread adoption of C-V2X with the next generation mobility technologies, the present application relates to a software application intelligence layer (e.g., an intelligent software agent based cross-layer monitoring mechanism) in place within the embedded device platforms (e.g., middleware) in the automotive vehicles (connected cars). This approach can be seen as simple, flexible and adaptable in real-time based on the mobility network dynamics, closed-loop radio network monitoring, and tight control, as well as take into account geo-targeted broadcast/unicast application/services requirements.

In example embodiments, a network device executing the intelligent software agent can closely monitor the northbound and southbound messaging interactions that take place between the applications and underlying signal processing layers associated with the mobility technology, as well as the resources allocated in a targeted region. With integrated analytics capability, the network device can be operable for monitoring, correlating cross-layer interactions, trending the dynamics of the radio channel conditions per spectral allocation for the transported multicast user data. Such an agent can self-trigger automated notification alerts to request enhancements from the mobility core network on-demand to aid in the adaptations of the FEC (e.g., facilitate the selection of a more suitable codeword if conditions call for it), based on the cell efficiency metrics as well as the eMBMS serving area dynamics surrounding the specific automotive vehicle's mobility path.

Further, the example integrated agent in the device middleware can periodically track such performance at the individual unicast/broadcast service flow level via correlated mapping with critical attributes (e.g., application layer—streams, duration, battery life, security controls, signal processing layer—serving area geo-fencing, spectrum resources utilized for broadcast/unicast, RSSI, SNR, FEC rates in a given serving area) and maintain a transient inventory of the mobility path for a device. By providing on-demand threshold-based triggers via mobile originated unicast data connections, the connected-car device platform can be in a position to securely relay its behavioral-service delivery and quality patterns and tightly interwork with the network functions to adapt its usability conditions to derive more optimal downstream broadcast service quality.

FIG. 1 illustrates some example components of a typical wireless communication system 100 (also referred to as wireless system 100, mobile system 100, mobile communications system 100). In example embodiments (also referred to as non-limiting embodiments), wireless communications system 100 can comprise a mobile (also referred to as cellular) network 106, which can comprise one or more mobile networks typically operated by communication service providers. The wireless communication system 100 can also comprise one or more user equipment (UE) $102_{1-N}$ (also referred to as UE 102). UE $102_{1-N}$ can communicate with one another via one or more network node devices (also referred to as network nodes) $104_{1-N}$ (referred to as network node 104 in the singular) of the mobile network 106. The dashed arrow lines from the network nodes $104_{1-N}$ to the UE $102_{1-N}$ represent downlink (DL) communications and the solid arrow lines from the UE $102_{1-N}$ to the network nodes $104_{1-N}$ represent uplink (UL) communications.

UE 102 can comprise, for example, any type of device that can communicate with mobile network 106, as well as other networks (see below). The UE 102 can have one or more antenna panels having vertical and horizontal elements. Examples of a UE 102 comprise a target device, device to device (D2D) UE, machine type UE, or UE capable of machine to machine (M2M) communications, personal digital assistant (PDA), tablet, mobile terminal, smart phone, laptop mounted equipment (LME), universal serial bus (USB) dongles enabled for mobile communications, a computer having mobile capabilities, a mobile device such as cellular phone, a dual mode mobile handset, a laptop having laptop embedded equipment (LEE, such as a mobile broadband adapter), a tablet computer having a mobile broadband adapter, a wearable device, a virtual reality (VR) device, a heads-up display (HUD) device, a machine-type communication (MTC) device, and the like. UE 102 can also comprise IOT devices that communicate wirelessly. In example embodiments of the present application, the UE 102 can be a C-V2X wireless device within a vehicle (e.g., C-V2X UE enabling C-V2X communications). Or, the vehicle itself can be said to be a C-V2X UE. In example embodiments of the present application, as will be described below, a C-V2X UE can comprise a software application intelligence layer (e.g., an intelligent software agent based cross-layer monitoring mechanism) in place within the embedded device platforms (e.g., middleware) of the C-V2X UE.

Mobile network 106 can include various types of disparate networks implementing various transmission protocols, including but not limited to cellular networks, femto networks, picocell networks, microcell networks, internet protocol (IP) networks, Wi-Fi networks associated with the mobile network (e.g., a Wi-Fi "hotspot" implemented by a mobile handset), and the like. For example, in at least one implementation, wireless communications system 100 can be or can include a large scale wireless communication network that spans various geographic areas, and comprise various additional devices and components (e.g., additional network devices, additional UEs, network server devices, etc.).

Still referring to FIG. 1, mobile network 106 can employ various cellular systems, technologies, and modulation schemes to facilitate wireless radio communications between devices (e.g., the UE 102 and the network node 104). While example embodiments might be described for 5G New Radio (NR) systems, the embodiments can be applicable to any radio access technology (RAT) or multi-RAT system where the UE operates using multiple carriers. For example, wireless communications system 100 can be of any variety, and operate in accordance with standards, protocols (also referred to as schemes), and network architectures, including but not limited to: global system for mobile communications (GSM), 3GSM, GSM Enhanced Data Rates for Global Evolution (GSM EDGE) radio access network (GERAN), Universal Mobile Telecommunications Service (UMTS), General Packet Radio Service (GPRS), Evolution-Data Optimized (EV-DO), Digital Enhanced Cordless Telecommunications (DECT), Digital AMPS (IS-136/TDMA), Integrated Digital Enhanced Network (iDEN), Long Term Evolution (LTE), LTE Frequency Division Duplexing (LTE FDD), LTE time division duplexing (LTE TDD), Time Division LTE (TD-LTE), LTE Advanced (LTE-A), Time Division LTE Advanced (TD-LTE-A), Advanced eXtended Global Platform (AXGP), High Speed Packet Access (HSPA), Code Division Multiple Access (CDMA), Wideband CDMA (WCMDA), CDMA2000, Time Division Multiple Access (TDMA), Frequency Division Multiple Access (FDMA), Multi-carrier Code Division Multiple Access (MC-CDMA), Single-carrier Code Division Multiple Access (SC-CDMA), Single-carrier FDMA (SC-FDMA), Orthogonal Frequency Division Multiplexing (OFDM), Discrete Fourier Transform Spread OFDM (DFT-spread OFDM), Single Carrier FDMA (SC-FDMA), Filter Bank Based Multi-carrier (FBMC), zero tail DFT-spread-OFDM (ZT DFT-s-OFDM), Unique Word OFDM (UW-OFDM), Unique Word DFT-spread OFDM (UW DFT-Spread-OFDM), Cyclic Prefix OFDM (CP-OFDM), resource-block-filtered OFDM, Generalized Frequency Division Multiplexing (GFDM), Fixed-mobile Convergence (FMC), Universal Fixed-mobile Convergence (UFMC), Multi Radio Bearers (RAB), Wi-Fi, Worldwide Interoperability for Microwave Access (WiMax), and the like.

Still referring to FIG. 1, in example embodiments, UE 102 can be communicatively coupled (or in other words, connected) to a network node 104 of the mobile network 106. Network node 104 can have a cabinet and other protected enclosures, an antenna mast, and multiple antennas for performing various transmission operations (e.g., MIMO operations). Each network node 104 can serve several cells, also called sectors, depending on the configuration and type of antenna. Network node 104 can comprise NodeB devices, base station (BS) devices, mobile stations, access point (AP) devices, and radio access network (RAN) devices. Network node 104 can also include multi-standard radio (MSR) radio node devices, including but not limited to: an MSR BS, an eNode B device (e.g., evolved NodeB), a network controller, a radio network controller (RNC), a base station controller (BSC), a relay device, a base transceiver station (BTS), an access point, a transmission point (TP), a transmission/receive point (TRP), a transmission node, a remote radio unit (RRU), a remote radio head (RRH), nodes in distributed antenna system (DAS), and the like. In 5G terminology, the network node is referred to by some as a gNodeB (gNB) device, which provides NR user plane and control plane protocol terminations towards the UE, and connects to the 5G core.

Figure 2:
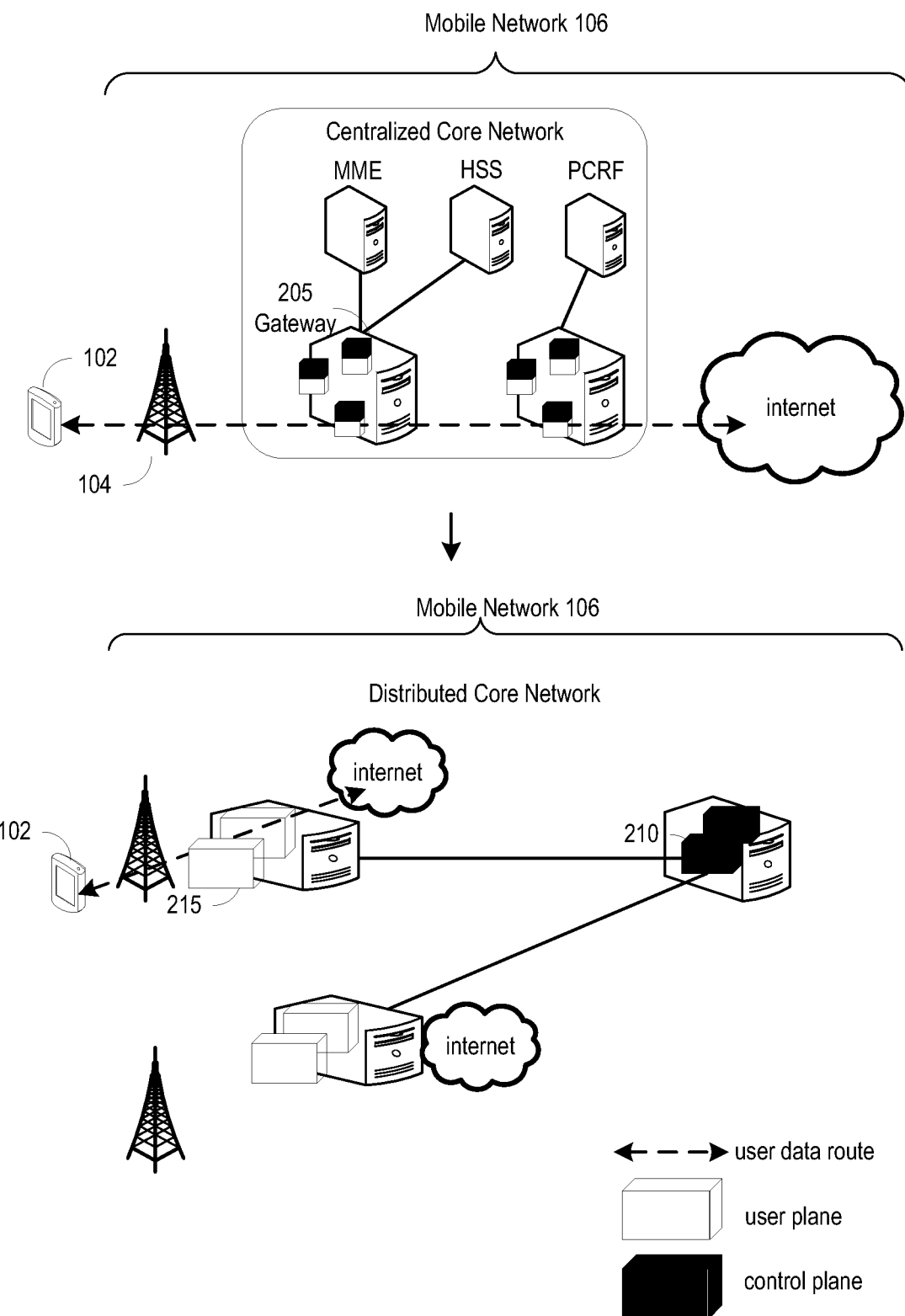
FIG. 2 illustrates an example centralized core network (CN) in comparison with a distributed CN implementing control plane and user plane separation, in accordance with various aspects and example embodiments of the subject application.

Referring now to FIG. 2, example embodiments of a mobile network of the present application can employ an architecture in which a user plane and control plane are separate, wherein complex control plane functions are abstracted from forwarding elements, simplifying user plane operations by relocating control logic to physical or virtual servers. Each plane carries a different type of traffic and can be implemented as overlay networks that runs independently on top of one another, although supported by its infrastructure. The user plane (sometimes known as the data plane, forwarding plane, carrier plane, or bearer plane) carries the network user traffic, and the control plane carries signaling traffic. Typical control-plane functionality includes capabilities such as the maintenance of location information, policy negotiation and session authentication. In example embodiments, the planes can be implemented in the firmware of routers and switches. As shown in FIG. 2, a mobile network (e.g., mobile network 106) with a centralized core network (CN) can be decentralized, resulting in a distributed CN, which acts as a controller in a mobile communication network, and performs underlying tasks required for providing mobile communication services (e.g., user authentication, data transmission, etc.). To abstract the network resources from the underlying physical hardware, the control plane and user plane are separated, abstracting the network resources from the underlying physical hardware. This separation allows user-plane functionality to move to the network edge, and management functionality to remain at the core.

Figure 7:
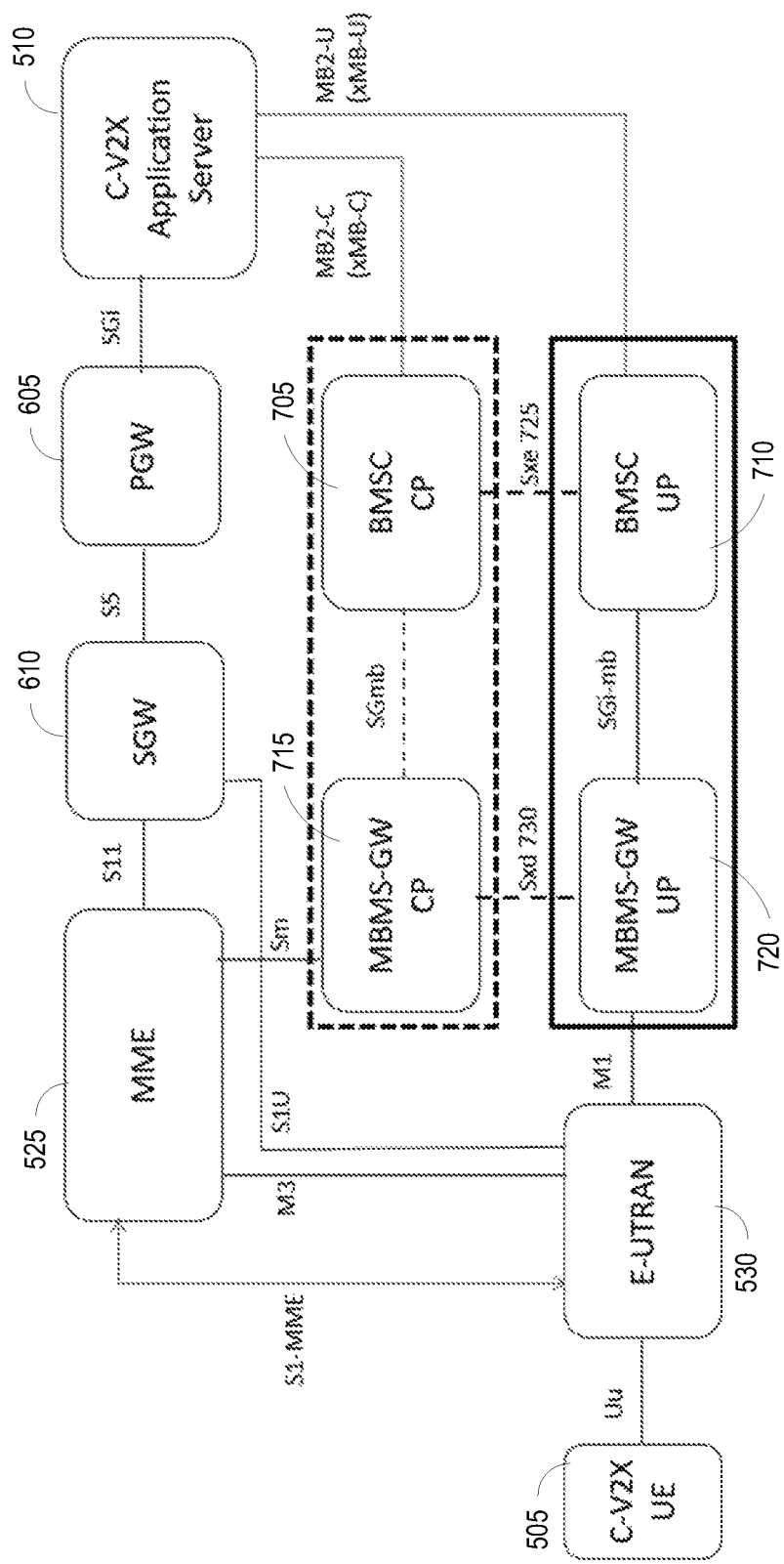
FIG. 7 illustrates example components for C-V2X communications wherein the user plane and control plane are separated for a multimedia broadcast multicast services gateway (MBMS-GW) component and for a broadcast multicast service center (BMSC) component, in accordance with various aspects and example embodiments of the subject application.
Figure 8:
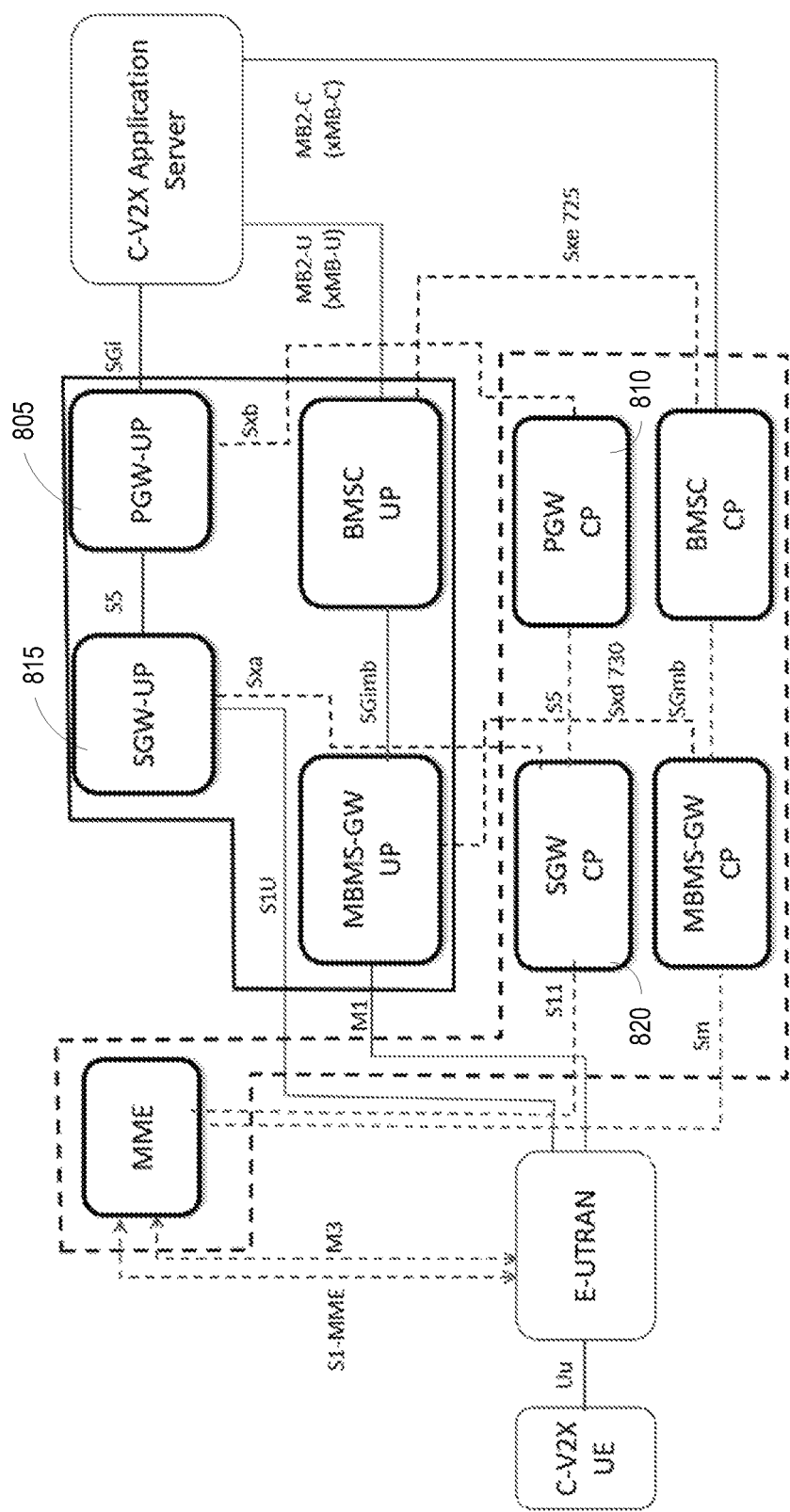
FIG. 8 illustrates example components for C-V2X communications wherein the user plane and control plane are separated for a MBMS-GW component, a BMSC component, a serving gateway (SGW) component, and a packet data network gateway (PGW) in accordance with various aspects and example embodiments of the subject application.

For example, as shown in FIG. 2, a gateway (GW) 205 in a centralized CN can, in a distributed CN, be separated into a GW-CP 210 for the control plane and GW-UP 215 for the user plane, wherein the user plane functionality is closer to the network edge. In this distributed CN, the physical core can be virtually separated and relocated in the network into multiple virtual core networks using virtualization technology. This software-defined networking (SDN) approach, can be complimentary to a network functions virtualization (NFV) approach, in which a virtual network function (VNF) is responsible for handling specific network functions (NFs) that run on one or more virtual machines (VMs) on top of the hardware networking infrastructure (e.g., routers, switches, etc.). Individual VNFs can be connected or combined to offer a particular network communication service. Both SDN and VNF can facilitate the implementation of network slicing (described further below). FIG. 7 and FIG. 8 below describe some more components that can be separated into control and user planes.

Figure 3:
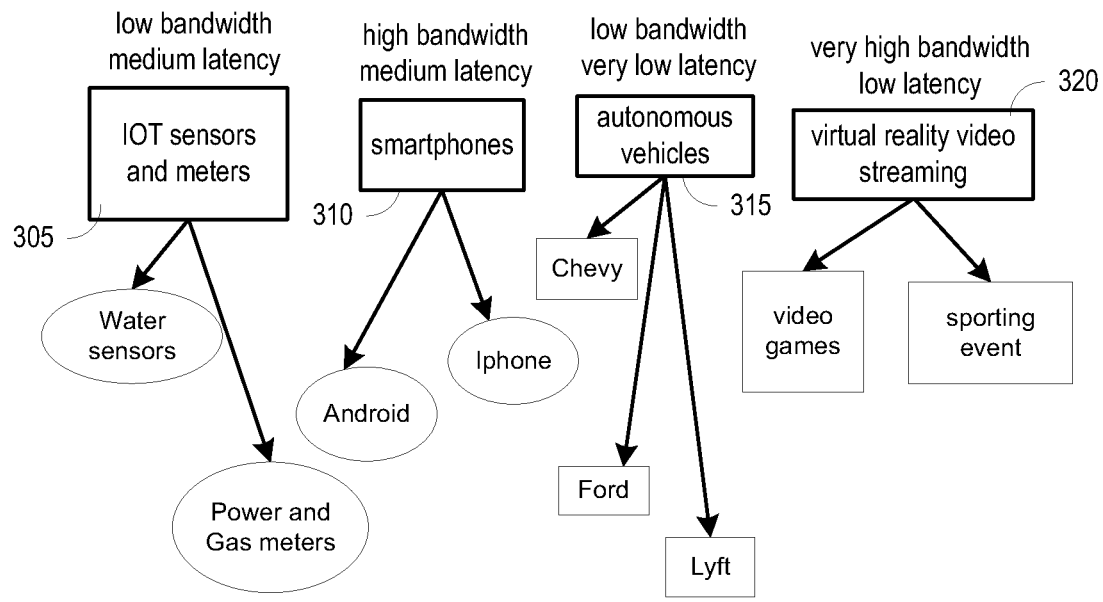
FIG. 3 illustrates the bandwidth and latency requirements for different communication services, in accordance with various aspects and example embodiments of the subject application.

Network services can be handled by decentralized virtual network functions, called network slices, that are instantiated either for a specific, dedicated service, or group of services, utilized by subscribers or large enterprises. These slices are made to perform specific tasks depending on the location, quality of service (QoS) and capacity of a given service. Thus, instead of having one network that serves all devices on the network and performs all services, a single physical network can be sliced into multiple virtual networks that can draw from both CN and radio access network (RAN) resources to provide a specific service. In this manner, network slices can be specifically configured to support a multitude of use cases and new services. Each use case involves performance requirements that vary enormously. As shown in FIG. 3, the bandwidth and latency related to each service can vary. IOT sensors and meters 305 might require service that is low bandwidth and medium latency. Smartphones 310 might require high bandwidth and medium latency. Autonomous vehicles 315 relying on V2X might require low latency but not necessarily a high bandwidth for every communication application. Virtual reality video streaming 320 that supports video games and live sporting events might require a very high bandwidth, but low latency. As such, different use cases place different requirements on the network in terms of functionality. Each specific service requires different resources, receiving a specific set of optimized resources and network topology that covers certain service level agreement specified factors for delivering the service, including such factors as such as connectivity, speed, latency and capacity. For example, for autonomous vehicle services 320, Ford, Lyft, or Chevy might each have a different service level agreement with a network provider to support their autonomous vehicle communication services.

Figure 4:
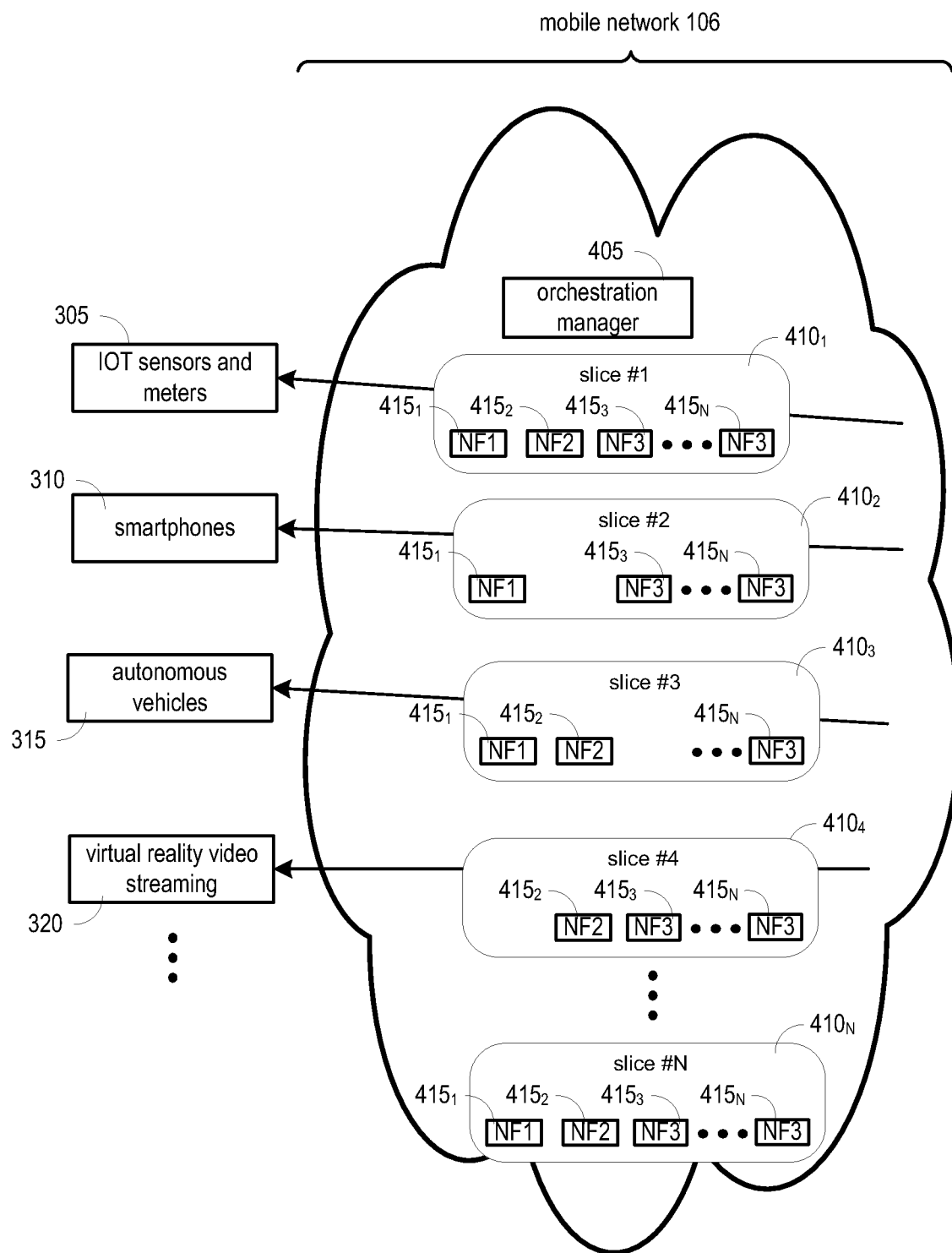
FIG. 4 illustrates an example of network slices, each having combinations of network functions, in accordance with various aspects and example embodiments of the subject application.

Referring now to FIG. 4, a service orchestration manager 405 can instantiate network slices $410_{1-N}$ of the network comprising combinations of vNFs (virtual network functions (NFs)) on default hardware (HW) in order to reduce the network complexity, and provide capital savings on proprietary HW and software. Each network slice can be instantiated, depending on, for example, the location (such as dedicated slice close to a large customer enterprise) or quality of service (e.g., high QoS slice for a premium service). These slices are part of cloud network running on a default hardware with given limitations such as number of dedicated processors and memory, etc. As shown in FIG. 4, with network slicing, each of these services can be delivered over the same common physical network on multiple virtual network slices to optimize use of the physical network. A slice #1 $410_1$ can be instantiated to support IOT meters and sensors 305. A slice #2 $410_2$ can serve smartphones. A slice #3 $410_3$ can serve autonomous vehicles 315. A slice #4 $410_4$ can support virtual reality video streaming 320. N number of slices in the network (e.g., slice # N $410_N$) can be instantiated to support other services. Each network slice can comprise an independent set of logical, network functions NFs $415_{1-N}$ (also referred to herein as tasks) that support the requirements of particular services (e.g., the term "logical" can refer to software), with some NFs that can be shared across multiple slices (e.g., NF1 $415_1$ is common across the slices), while other NFs are tailored to a particular network slice. An NF can comprise network nodes functionality (e.g. session management, mobility management, switching, routing functions) which has defined functional behavior and interfaces. Thus, NFs can be implemented as a network node (e.g., network node 104) on a dedicated hardware or as virtualized software functions. The service orchestration manager device 405 can perform selection functions that pair the resources and network topology (e.g., RAN and fixed access, terminal, transport, and CN resources) needed for the specific service and traffic that uses the slice. In this way, functions such as speed, capacity, connectivity and coverage can be allocated to meet the specific demands of each use case. Not only can a network slice be specifically instantiated for certain services, it can be reused.

Figure 5:
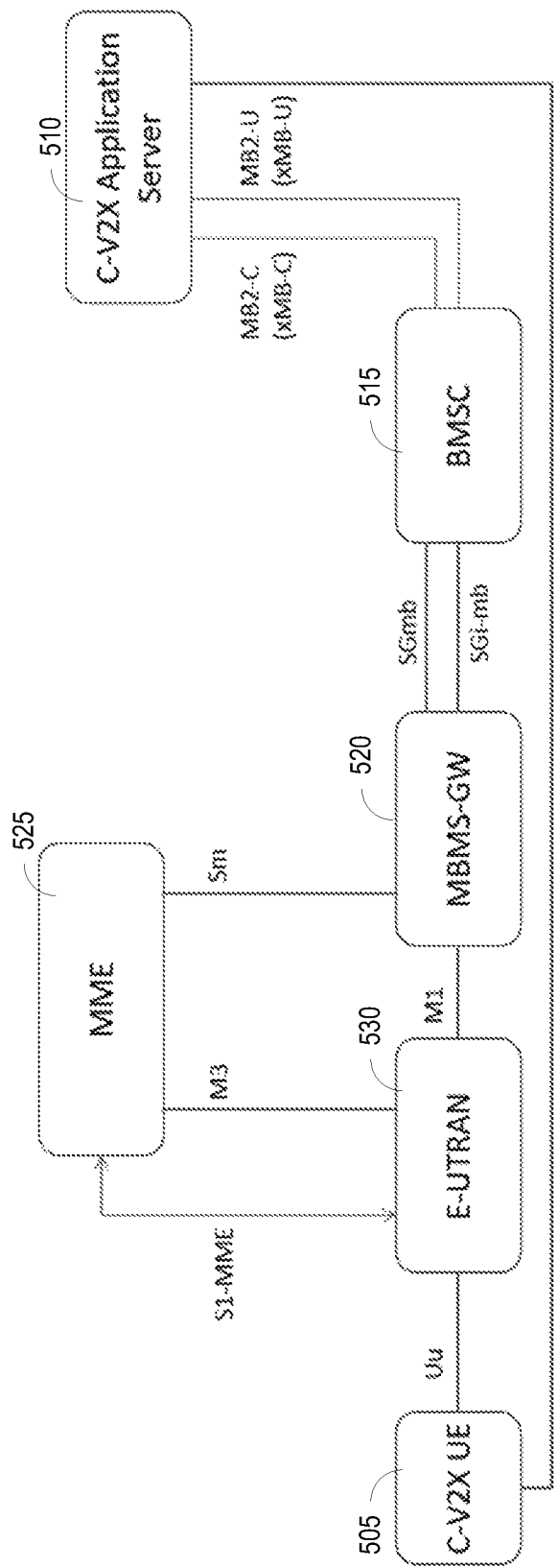
FIG. 5 illustrates example components for C-V2X communications, in accordance with various aspects and example embodiments of the subject disclosure.

In a typical C-V2X delivery network, as shown in FIG. 5, a C-V2X reference architecture can use eMBMS broadcast core network functions in, for example, an LTE mobility network, to deliver file downloads and deliver live streaming from the content source (C-V2X application server 505) to a large number of C-V2X UEs targeted in specific regions (e.g., UEs $102_{1-N}$, wherein a UE 102 can be enabled to communicate according to C-V2X standards, shown in the singular in FIG. 5 as C-V2X UE 505) C-V2X UE 505 can be a device in, or embedded in, for example a vehicle. A vehicle enabled with C-V2X communications can also be considered as a C-V2X UE. A variety of C-V2X UE device platforms could be used that support the appropriate eMBMS chipset/modem and application client capabilities. These could be embedded in the automotive vehicle within their traffic control unit. While simple clients with standard modem and application functions can deliver the eMBMS user services, they are often faced with challenges due to the dynamics of the radio conditions.

In this typical architecture as shown in FIG. 5 (e.g., a mobile network 106 implementing, for example, an LTE network), the C-V2X application server 510 triggers the broadcast (e.g., files, video streaming packets) to the head-end broadcast multicast service center (BMSC 515). Located at the core of the network, the BMSC manages the interface with content providers, including managing billing and the content to be transmitted over the mobile network. The BMSC initiates LTE broadcast session establishment with the multimedia broadcast multicast service gateway (MBMS-GW 520), which in turn interacts with a management mobility entity (MME) and eNodeB 530 to complete the process. As mentioned above, a network node 104 in LTE terminology can be referred to as an eNodeB 530. Control plane eMBMS signaling can be initially established in the mobility core network via multiple signaling interfaces between the various network functions: C-V2X Application Server-BMSC via the MB2-C/xMB-C interface, BMSC-MBMS GW via the SGmb interface, MBMS GW-MME via the Sm interface, MME-eNB via M3 interface and eNB-UE via the Uu interface. The radio access network (RAN) eNodeB 530 joins the MBMS GW upon session completion to start receiving the user data from the MBMS GW via the M1 interface. User data from C-V2X-Application Server is transferred to BMSC via MB2-U/xMB-U interface, and from the BMSC to MBMS GW via the SGi-mb interface. With multiple interfaces involved in the control plane setup, the session establishment times could be longer depending on the geographical location of the various core network functions.

Additionally, the RAN can be provisioned with the band specific information for associated LTE-B data transfers—statically or dynamically based on external triggers from spectrum management systems, based on their availability and utilization in a given geographic area. UE devices (C-V2X UE 505) can tune into the broadcast as long as they support the client and are in the multi-frequency single-frequency network (MBSFN) spectral radio coverage area.

Figure 6:
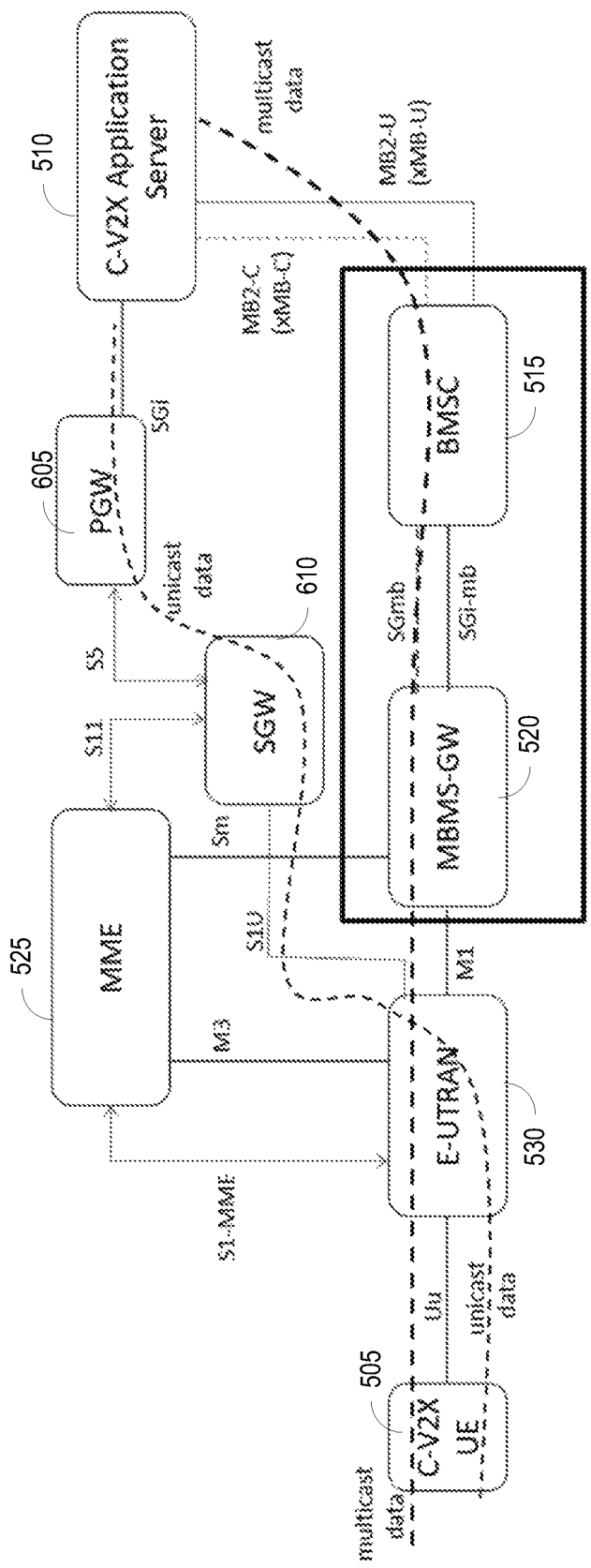
FIG. 6 illustrates example components for C-V2X unicast and multicast communications, in accordance with various aspects and example embodiments of the subject application.

Moving on to FIG. 6, the network functions and components supporting both unicast and broadcast services are shown. Unicast data connection establishments follow the standard packet data network (PDN) connection setup process with bearer establishments. Contrary to unicast connections that require a specific access point name (APN), broadcast services do not require any APN subscription within the home subscriber server (HSS) systems. The broadcast services are triggered by the C-V2X application server (e.g., C-V2X application server 510) within the content delivery network at operator defined intervals and for a given duration in a given location.

Still referring to FIG. 6, core network functions such as BMSC/MBMS-GW/MME/SGW/PGW and AS can be virtualized and can be hosted in a cloud data center. In FIG. 6, the path of unicast data moves through a packet data network gateway (PGW) and a serving gateway (SGW). These two components performing the PGW and SGW functions are shown as PGW 605 and SGW 610 in FIG. 6. These functions can be centralized or distributed based on operator's deployment model for mobility services delivery. A subset of these functions can be co-located closer to the RAN clusters where appropriate to reduce the latency aspects of targeted multicast user plane data transfers in a given broadcast serving area. RAN nodes can be LTE-broadcast capable in concentrated areas serving both unicast and multicast data transfers (e.g., dashed lines in FIG. 6) across multiple spectrum allocations and availability in a given geographic area. Spectrum analysis and monitoring can ensure proper utilization of broadcast and unicast resources in real time to provide maximum return on investment (ROI) to operators.

While the broadcast core network components can be hosted along with the unicast core network functions, such deployments may not necessarily be optimal for flexible service offerings. All core functions could be physical or virtualized in data centers and could be deployed in a centralized or distributed configurations to meet specific operator needs. A subset of the core network functions, such as broadcast nodes, could be localized to meet the stringent service quality needs.

Due to the heavy control plane and user data forwarding interactions required to support a mix of unicast and broadcast services, the core network components with their traditional integrated control and user plane functions may be limited with respect to their capacity and scalability while supporting geo-redundancy. To address the scale, multiple functions need to be replicated in several data center locations which could become very expensive. Even with NFV/SDN transformation, such virtual functions may need to be instantiated at several data centers and may still be limited by the underlying network infrastructure reliability when supporting a mix of complex protocols and their associated packet handling functions at the transport layer. Additionally, disjoint unicast and broadcast configurations operating in a standalone manner is not optimal and could result in a network utilization imbalance as well as being prohibitively expensive due to spectrum allocations in certain deployment situations.

The present application facilitates the mitigation of the above situation by separating control and user plane functions for broadcast core network functions as shown in FIG. 7. While 3GPP Rel.14 standards have recently completed the control and user plane separation (CUPS) feature in the EPC core network for unicast data services, no such model and/or feature capability exists for broadcast (e.g., multicast) core network functions. Referring to FIG. 7, in example embodiments in accordance with the present application, there two signaling interfaces Sxe and Sxd, between the MBMS GW Control and User Plane functions as well as between the BMSC Control and User plane functions are established. As shown in FIG. 7, the MBMS-GW 520 and the BMSC 515 can be separated based on control plane and user plane functionality. Thus, the BMSC 515 can be separated into a BMSC-Control Plane (e.g., BMSC-CP 705) and BMSC-User Plane (e.g., BMSC-UP 710), and the MBMS-GW 520 can be separated into a MBMS-GW-Control Plane (MBMS-GW-CP 715) and MBMS-GW-User Plane (MBMS-GW-UP 720). The separation also results in an interface between the BMSC-CP and BMSC-UP (Sxe 725), and an interface between the MBMS-GW-CP and MBMS-GW-UP (Sxd 730) Such separation offers flexibility for operators to deploy broadcast control and user plane functions in a centralized and/or distributed configuration and scale independently based on as needed basis in targeted locations. Localizing user plane broadcast functions closer to the RAN can significantly benefit deployments and can simplify the mobility network infrastructure cost economics. Several advantages can result for mobile operators as well as content providers by being able to competitively position themselves for disruptive localized and targeted broadcast services. Such network configurations can drive reduced backhaul requirements, benefiting live streaming service flows that are extremely sensitive to latency, delay, radio link errors and channel switching times. By monitoring the control and user plane functions in conjunction with the intelligence reception reports received from the end points, viewing experiences could be further enhanced locally that could in turn drive services adoption.

FIG. 8 shows example embodiments in accordance with the present application of an integrated evolved control and user plane separation (eCUPS) for more efficient and dynamic unicast/multicast flow transfer, wherein, the PGW (e.g., PGW 605) and SGW (e.g., SGW 610) are also separated into control plane and user plane. Thus, as shown in FIG. 8, the PGW can be separated into a PGW-User Plane (PGW-UP 805) and a PGW-Control Plane (e.g., PGW-CP 810), and the SGW can be separated into an SGW-User Plane (e.g., SGW-UP 815) and SGW-Control Plane (e.g., SGW-CP 820). With integrated control and user plane functions separation supporting both unicast and broadcast services as shown in FIG. 8, operators have even better flexibility in terms of network deployment and operations benefiting service dynamics in targeted locations. Such an architecture also facilitates independent scaling between control and user plane functions for simultaneous unicast and multicast/broadcast session/connection establishments as well as associated user data transfers while not impacting legacy functionality of the existing nodes undergoing the functional split.

Figure 9:
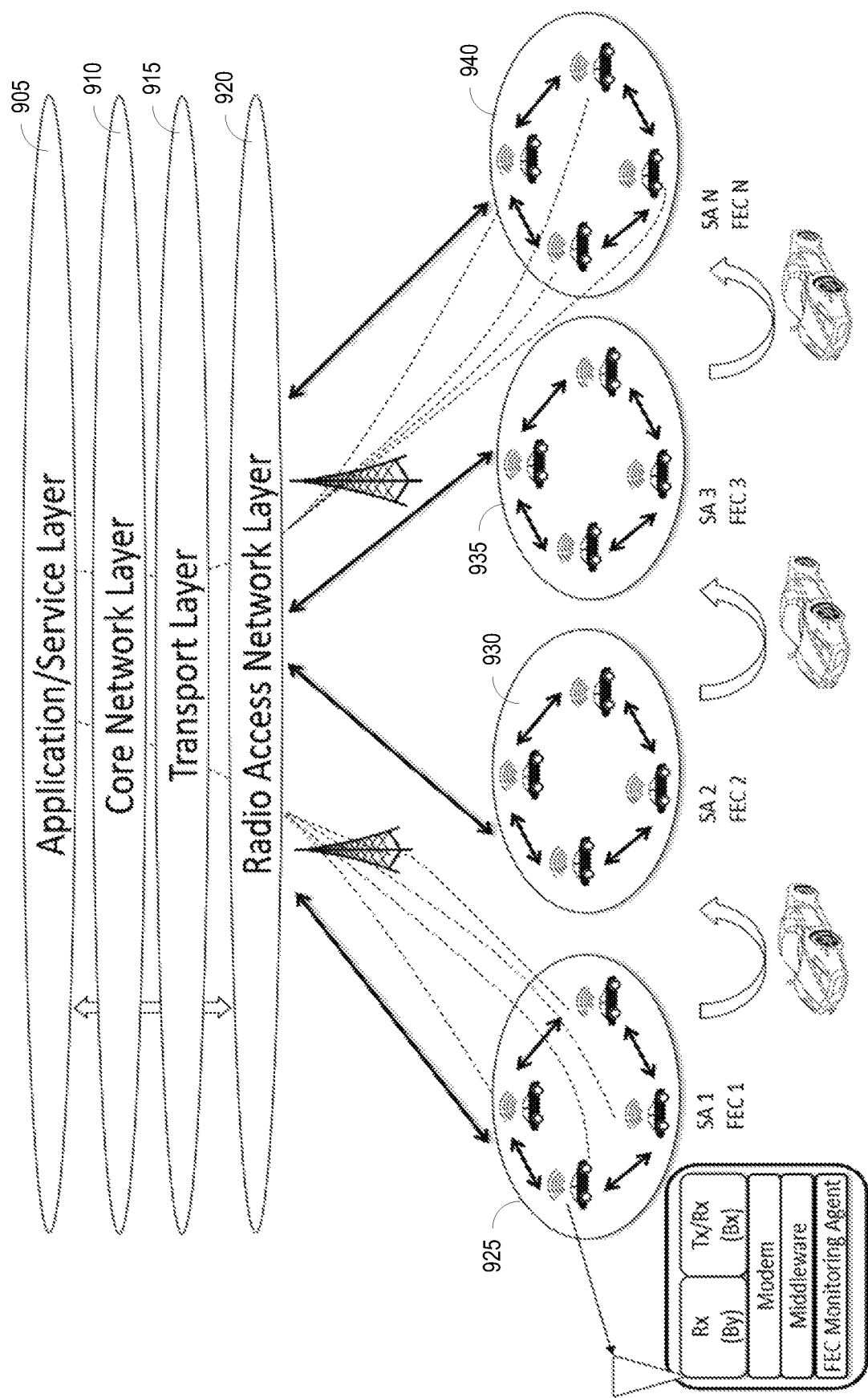
FIG. 9 illustrates an example of the different network layers and the use of different FEC codes across difference service areas, in accordance with various aspects and example embodiments of the subject application.

As mentioned above with respect to FIG. 4, network slices can be specifically configured to support a multitude of use cases and new services. Mobile operators could leverage NFV/SDN principles to slice the control/user plane network functions for unicast/broadcast and orchestrate such functions in the most desirable high-density environments (concerts, trade shows, school/college game events etc.) where the impact is extremely high with respect to delivering superior service quality. In FIG. 9, where the users with specific device types are distributed across multiple broadcast serving areas within a given MBSFN region, localized core user plane deployments can yield much better performance results during mobility. Based on a closed loop monitoring within the devices (e.g., C-V2X UEs) in targeted broadcast areas and reports of service quality, user plane broadcast functions can be scaled locally and independently of the control plane broadcast functions to enhance the end user experience. Based on the eMBMS service quality reception reports received from connected cars and processed by the C-V2X application server, it can immediately trigger enhanced application layer FEC (AL-FEC) rates to localized BMSC-CP, which in turn can send updates in targeted broadcast serving areas where the end points can selectively use that information based on dynamics of their radio conditions.

Figure 10:
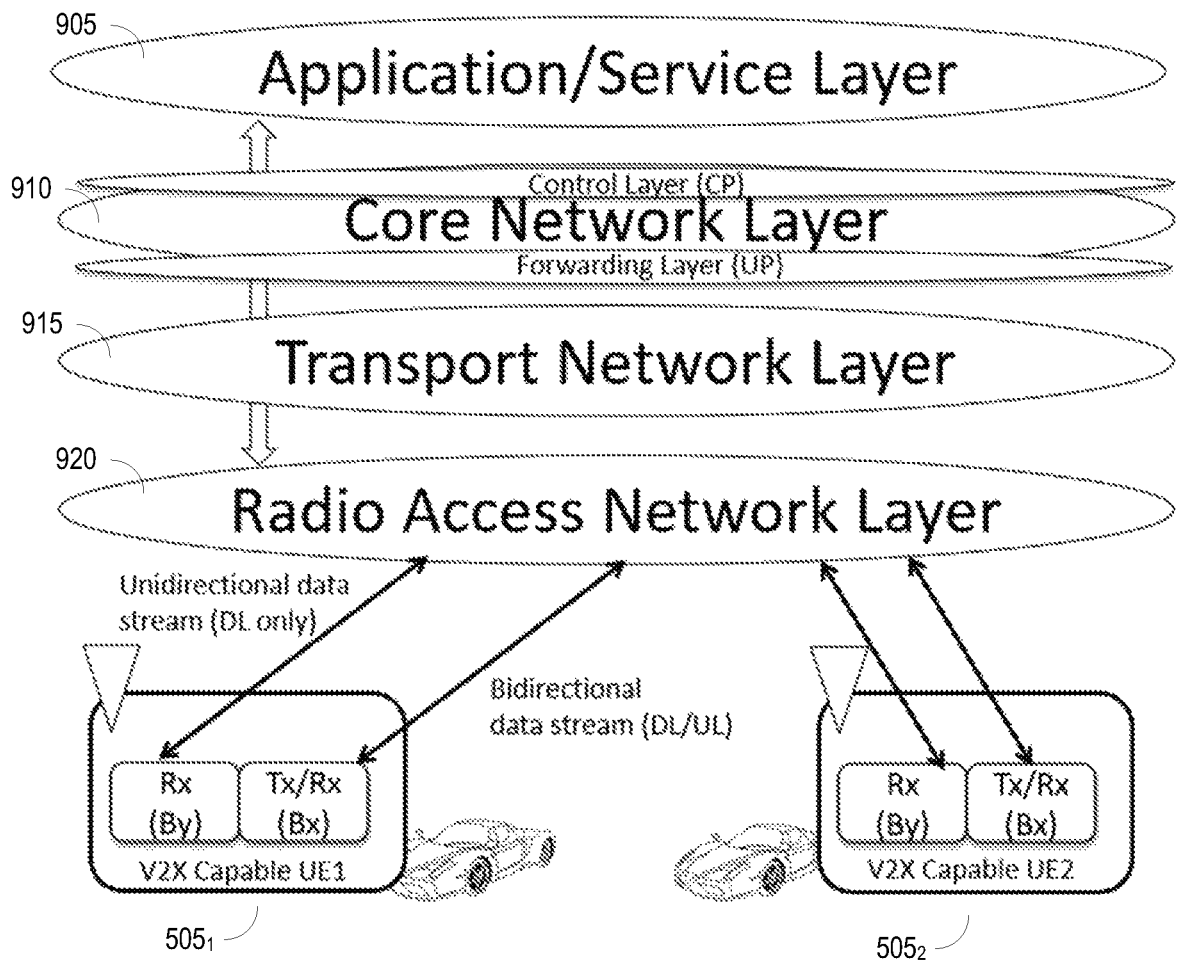
FIG. 10 illustrates an example of the different layers and the data path for evolved MBMS (eMBMS), in accordance with various aspects and example embodiments of the subject application.
Figure 11:
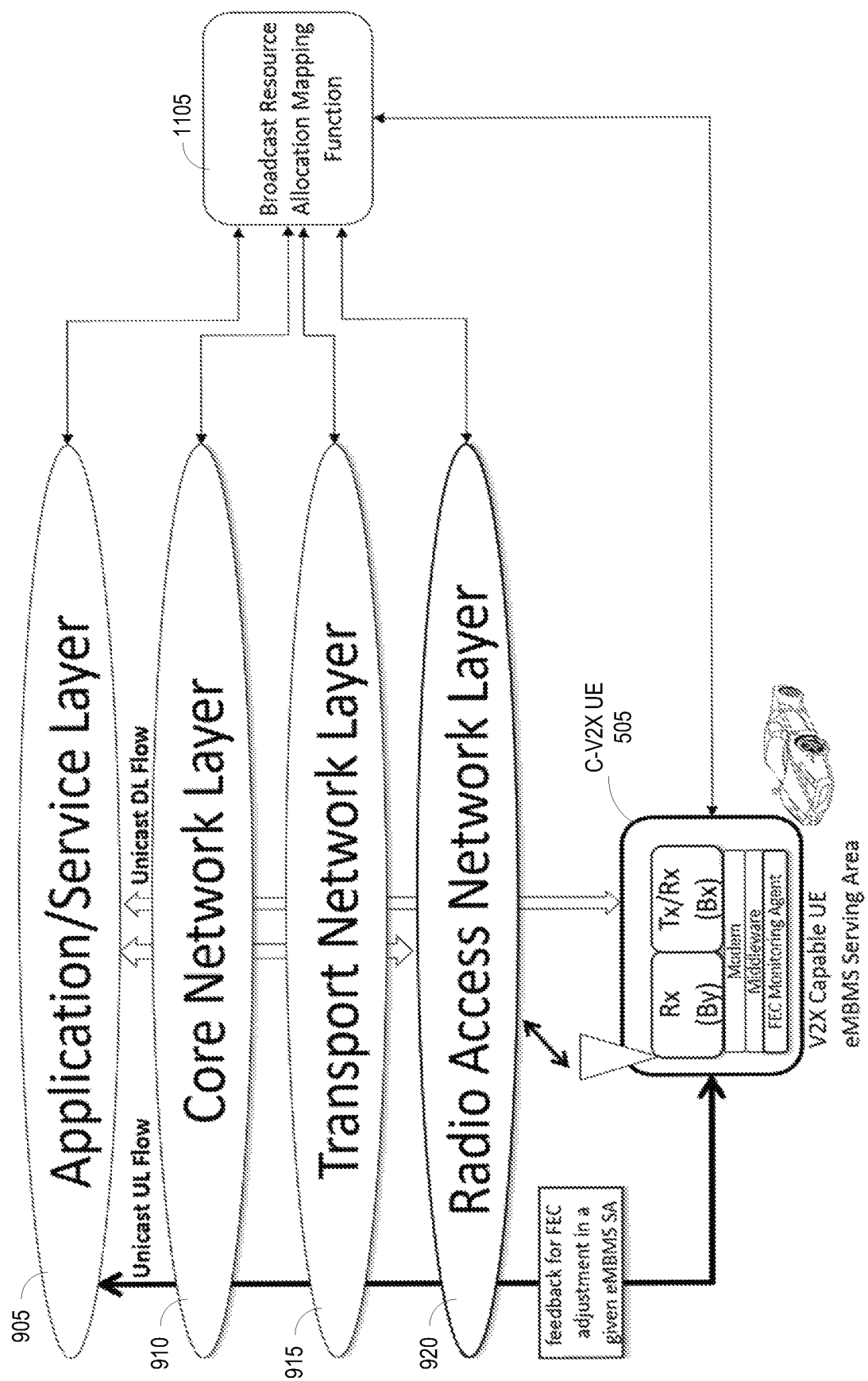
FIG. 11 illustrates an example of flow monitoring and FEC adaptation in the eMBMS, in accordance with various aspects and example embodiments of the subject application.

As an example, as shown in FIG. 9, eMBMS communications can involve several layers, for example, the application/service layer 905, the mobility core network layer 910, the mobility transport network layer 915, and the radio access network layer 920 (which the network nodes 104 are part of). At the application/service layer 905, a C-V2X application server can transmit, for example, video data, destined for C-V2X UEs in different service areas. Connected cars during mobility can cross broadcast serving areas (service area 1 925, service area 2 930, service area 3 935, service area N 940) as shown in FIG. 9, and may operate in multi-mode based on their embedded device platform capabilities. They may be able to switch from one device category to another (ex: CAT 4 to CAT 6 or CAT 19 or CAT 1) based on the intelligence synthesized by the middleware that works across the modem-application layers at the service flow level, as shown in FIG. 10 and FIG. 11. In each serving area, due to transmission conditions, one FEC code might be more suitable than another FEC code. Example embodiments of the present application allow for the selection of different FEC codes for different service areas, based on feedback provided, triggered by an analysis of the transmission conditions experienced by the C-V2X UE.

As shown in FIG. 10, the application/service layer 905 (e.g., an application server device, such as C-V2X application server 510) triggers the broadcast content to be delivered to the end user (e.g., C-V2X UE $505_1$, C-V2X UE $505_2$). The LTE-broadcast headend receives the data feed to be broadcasted to device/s in a given geographic area (MBSFN). Core, Transport and Access network functions are invoked to support the LTE broadcast session establishment. The eNB can be LTE-broadcast capable and operate with multiple licensed-unlicensed frequency bands/carriers. All supported bands might not be used for broadcast data transfer based on provisioning and service requirements. The eNB has the intelligence to schedule downlink (DL) user data transfers in a given band (By) upon joining the multicast group with the MBMS GW in the core network using the M1 interface. The C-V2X UE is tuned to both bands Bx and By being transmitted by eNB. Bx can be used for DL/UL notifications/triggers from the eNB/UE for an impending broadcast data transfer/related communication. Actual user data transfer is received in band By only to meet the service criteria.

Referring now to FIG. 11, example embodiments of a C-V2X UE (e.g., C-V2X UE 505) can provide feedback to the mobile core, leading to an adjustment to application layer forward error correction (AL-FEC), as will be described further below. Given the various degrees of freedom available in the network with spectrum allocation, active carriers, resource utilizations, aggregate capacity, services priority, FEC rate allocation and adaptation per flow in use, radio channel conditions, and service quality per active flow, the C-V2X UE 505 executing middleware in the C-V2X UE 505 can trigger generation of reception reports or notifications based on policy driven rules and/or threshold alerts (e.g., if a quality of service becomes low, or an SNR becomes high, or if a certain number of errors in a time period has been reached, etc.). The C-V2X UE can engage in cross-layer analysis (e.g., examine the physical layer, service layer, etc.) so as to correlate different attributes within the layers and make a determination as to whether the FEC code that is currently being used is optimal, or whether an adjustment needs to be made (e.g., use another FEC rate, or another FEC code, that would be more optimal). The reports and alerts (e.g., feedback) can be transmitted via a unicast uplink (UL) channel to the localized broadcast core network head-end. Such feedback can be extremely conducive for the network to be intelligent, and drive control of the application layer attributes, including application layer forward error correction (AL-FEC) in the devices in coordination with the modem layer FEC on a per-flow basis within a given serving area. Additionally, a broadcast resource mapping function component 1105, can track all the resource utilizations across the layers, which gives the C-V2X UE (e.g., the software agent within the device) a way to correlate all the different cross-layer attributes, which can allow it to provide an adjustment to the output FEC.

In example embodiments in accordance with the present application, a C-V2X UE (e.g., C-V2X UE 505) comprising a processor and a memory that stores executable instructions (e.g., middleware in example embodiments) that, when executed by the processor, enable the C-V2X UE 505 to monitor the conditions of transmissions to the C-V2X UE, and based on an analysis of parameters associated with the transmissions, provide feedback regarding which forward error correction code to use for decoding received transmissions. The feedback can be sent through the network core to an application layer server device (e.g., C-V2X application server 510) that broadcasts content to C-V2X UEs. In example embodiments, the C-V2X UE can receive a transmission (e.g., live streaming content) from a network device (e.g., network node) of a mobile network via a communication channel. The C-V2X UE can decode this transmission using a forward error correction code (e.g., first forward error correction code). The C-V2X UE can determine one or more attributes of the transmission to determine a condition of the communications channel. The attribute might relate to a physical condition of the channel. For example, the C-V2X UE can determine a signal to noise ratio (SNR) relate to the transmissions. The attribute might relate to a quality of service (e.g., a measured bandwidth). Another attribute might be the number of times there were errors in the transmissions (e.g., based a per flow basis, or based on a periodic basis). Each time that the number of bits in a transmission do not match up with the bits of a FEC code can be counted. If the SNR is too high, or the bandwidth is lower than an acceptable quality of service, or if there are too many errors, the condition of the communications channel can be determined to be poor, or not optimal. The C-V2X UE executing this middleware software can engage in cross-layer analysis and correlation, looking at all the attributes of these layers together to determine whether an adjustment in the FEC rate (e.g., select a different FEC code, for example) can be made that results in more optimum transmissions (e.g., reduction in errors in transmissions).

As such, based on the condition of the communication channel, the user equipment can facilitate transmitting feedback to the network device (e.g., network node 104), wherein the feedback is forwarded by the network device to an application server device that selects a second forward error correction code based on the feedback. As an example, if the feedback indicates that the channel conditions are poor, the application server device can select a second forward error correction code (e.g., one in which each FEC code word is longer) to be used by the C-UE device to decode subsequent transmissions. The application server can, in example embodiments, send the FEC code to be used by the C-V2X UE. In example embodiments, the C-V2X UE acknowledges the receipt of the FEC code by sending an acknowledgement to the application server. The C-V2X application server can then begin sending transmissions encoded with the newly selected FEC, and the C-V2X UE can decode the transmissions with the newly selected FEC. The new FEC correction code can not only be transmitted to the C-V2X UE, but can be broadcast to other C-V2X UE devices in the same service area, as those devices might be experiencing similar transmission conditions.

In other example embodiments, if the C-V2X UE already has stored in its memory the FEC codes, after evaluating the feedback and selecting a FEC code, the application server can send a message to the C-V2X UE indicating which FEC code the C-V2X UE should use for future transmissions (at least until monitored channel conditions warrant another change in the FEC being used). The C-V2X UE acknowledges the receipt of the indication message by sending an acknowledgement to the application server. The application server can then begin sending transmissions encoded with the newly selected FEC, and the C-V2X UE can decode the transmissions with the newly selected FEC.

In other example embodiments, it is the C-V2X UE that select the FEC to be used, and either sends the selected FEC code to the application server, or sends a message indicating to the application server which FEC code the application server should use for encoding subsequent transmissions from the application server to the C-V2X UE. The application server can send an acknowledgement indicating that it has received the message indicating which FEC code it should use. Once the acknowledgement has been sent, the application server can begin sending transmissions encoded with the FEC code selected by the C-V2X UE.

Figure 12:
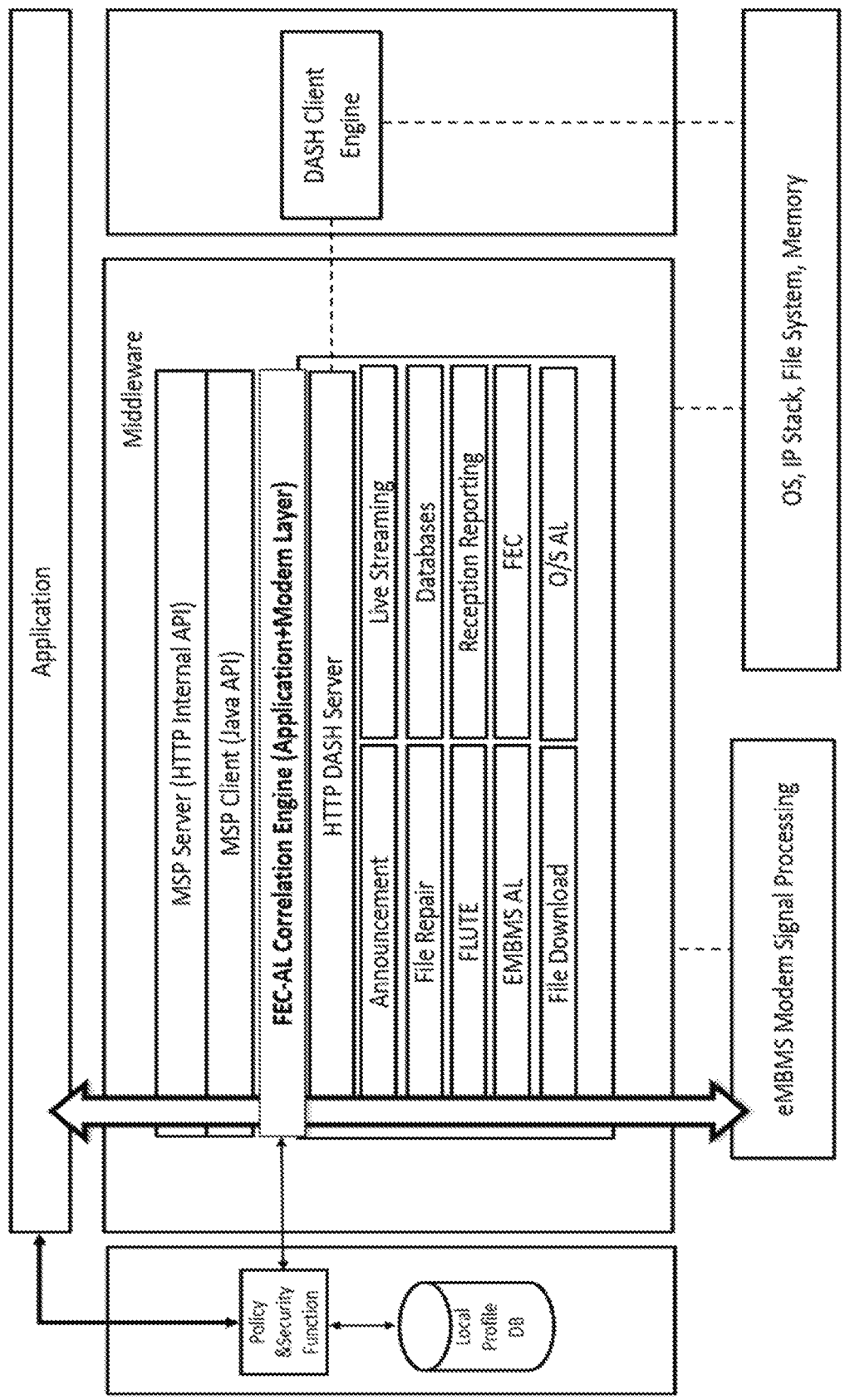
FIG. 12 illustrates an example of device cross-layer interactions, in accordance with various aspects and example embodiments of the subject application.

Now referring to FIG. 12, in example embodiments, the middleware correlation engine embedded in the device platform facilitates the C-V2X UE 505's monitoring capability on a per-flow level via cross-layer interactions, and then, based on policy driven threshold alerts (e.g., if an SNR reaches a threshold, or a bandwidth dips to a threshold, etc.), enables the C-V2X UE to provide of feedback to the network via a dedicated PDN connection using a specific APN. The PGW then notifies the targeted application server (C-V2X application server 510) destined to receive such feedback (e.g., a report, dashboard).

Once the C-V2X application server receives the feedback (e.g., report, dashboard), it can take proactive action to broadcast the FEC rate adaptations across the serving areas via the localized broadcast core network. By providing an on-demand threshold-based triggers per flow via mobile originated unicast data connections to the content delivery network head-end, the connected-car device platform is able to securely relay its behavioral-service flow delivery and quality patterns and tightly interwork with the mobility network functions to adapt its usability conditions to derive a more optimal downstream quality of service.

In example embodiments, a UE (C-2VX UE 505), comprising a processor and a memory that stores executable instructions that, when executed by the processor, facilitate performance of operations, including those operations/methods as described above, and also below in FIGS. 13-16. In each of these operations, steps or aspects described in one operation can be substituted or combined with steps and aspects with respect to the other operations, as well as features described, unless context warrants that such combinations or substitutions are not possible. Further, if a feature, step, or aspect is not described with respect to example operations, this does not mean that said feature, step, or aspect is incompatible or impossible with respect to those operations. As such, the example operations of the present application described above and below are not necessarily limited to the steps, features, or aspects that are described with respect to those example operations.

Figure 13:
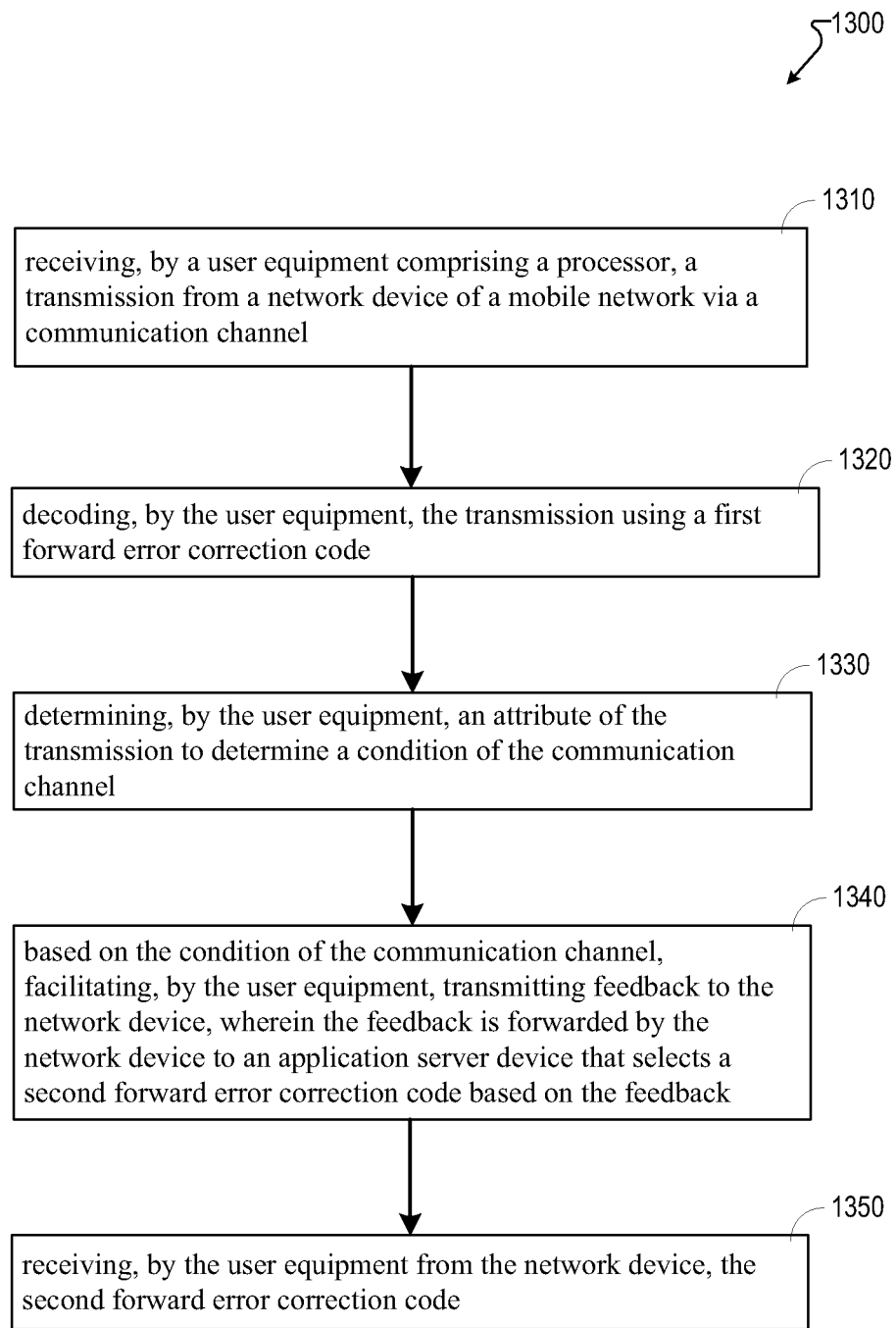
FIG. 13 illustrates an example of operations that can be performed by a C-V2X UE, in accordance with various aspects and example embodiments of the subject application.

FIG. 13 illustrates a flow diagram of example operations 1300 that can be performed, for example, by a user equipment (e.g., C-V2X UE 505) comprising a processor and a memory (e.g., a machine-readable storage medium) that stores executable instructions (e.g., software, and in example embodiments, software that comprises middleware) that, when executed by the processor, facilitate performance of the operations described in FIG. 13. The user equipment can be in a vehicle (or be the vehicle), and can also operate in accordance with an operating standard related to connecting the moving vehicle to the mobile network (e.g., a C-V2X standard).

The example operations 1300 can comprise, at block 1310, receiving a transmission from a network device (e.g., network node 104, which in LTE can be an eNodeB) of a mobile network via a communication channel. The transmission can comprise a multicast signal. The transmission can comprise video data.

The example operations 1300 can further comprise, at block 1320, decoding the transmission using a first forward error correction code.

At block 1330, the example operations 1300 can further comprise determining, by the user equipment, an attribute of the transmission to determine a condition of the communication channel. The attribute can relate to a quality of service (e.g., bandwidth, rate of transmission, etc.). The attribute can also relate to a physical condition of the communication channel.

At block 1340, the example operations 1300 can further comprise, based on the condition of the communication channel, facilitating transmitting feedback to the network device, wherein the feedback is forwarded by the network device to an application server device (e.g., C-V2X application server 510) that selects a second forward error correction code based on the feedback. In example embodiments, the feedback can be triggered based upon, for example, a signal to noise ration (SNR) being too high, or a bandwidth being at a rate that is lower than agreed to in a subscriber-level agreement (e.g., SLA). Additionally, the feedback can be triggered based on a determination that the quantity of errors in the received transmissions exceeded a certain rate. The facilitating the transmitting of the feedback can comprise facilitating the transmitting via a unicast uplink transmission channel.

The example operations 1300, at block 1350, can further comprise receiving, by the user equipment from the network device, the second forward error correction code.

Figure 14:
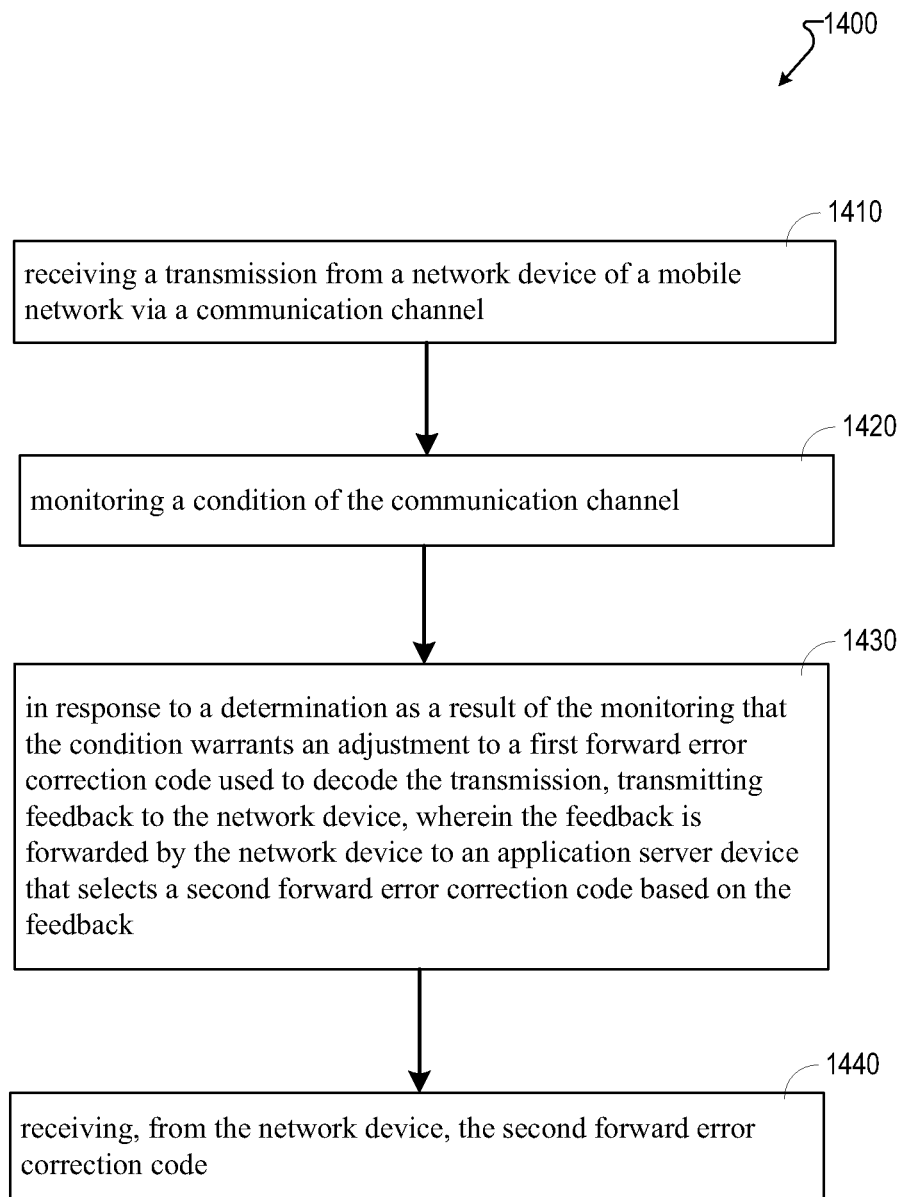
FIG. 14 illustrates another example of operations that can be performed by a C-V2X UE, in accordance with various aspects and example embodiments of the subject application.

FIG. 14 illustrates a flow diagram of example operations 1400 that can be performed, for example, by a user equipment (e.g., C-V2X UE 505) comprising a processor and a memory (e.g., a machine-readable storage medium) that stores executable instructions (e.g., software, and in example embodiments, software that comprises middleware) that, when executed by the processor, facilitate performance of the operations described in FIG. 14. The user equipment can be in a vehicle (or can be the vehicle), and can also operate in accordance with an operating standard related to connecting the moving vehicle to the mobile network (e.g., a C-V2X standard).

The example operations 1400, at block 1410, can comprise receiving a transmission (e.g., a multicast signal comprising video data) from a network device of a mobile network via a communication channel.

The example operations 1400, at block 1420, can further comprise monitoring a condition of the communication channel. The monitoring the condition can comprise determining an attribute related to a quality of service. The quality of service is determined by a subscriber level agreement. The monitoring the condition can entail, for example, determining whether a bandwidth dips below a guaranteed bandwidth based on a subscriber level agreement of the user of the C-V2X UE, or a subscriber level agreement of the provider of a service associated with the provision of C-V2X services.

The example operations at block 1430 can further comprise, in response to a determination, as a result of the monitoring, that the condition warrants an adjustment (e.g., selection of a more suitable FEC code) to a first forward error correction code used to decode the transmission, transmitting feedback (e.g., via a unicast uplink transmission channel) to the network device, wherein the feedback is forwarded by the network device (e.g., network node 104) to an application server device (e.g., C-V2X application server 510) that selects a second forward error correction code based on the feedback.

At block 1440, the operations can comprise receiving, from the network device, the second forward error correction code. The user equipment can then use the second forward error correction code to decode subsequent transmissions it receives that were encoded using the second forward error correction code.

Figure 15:
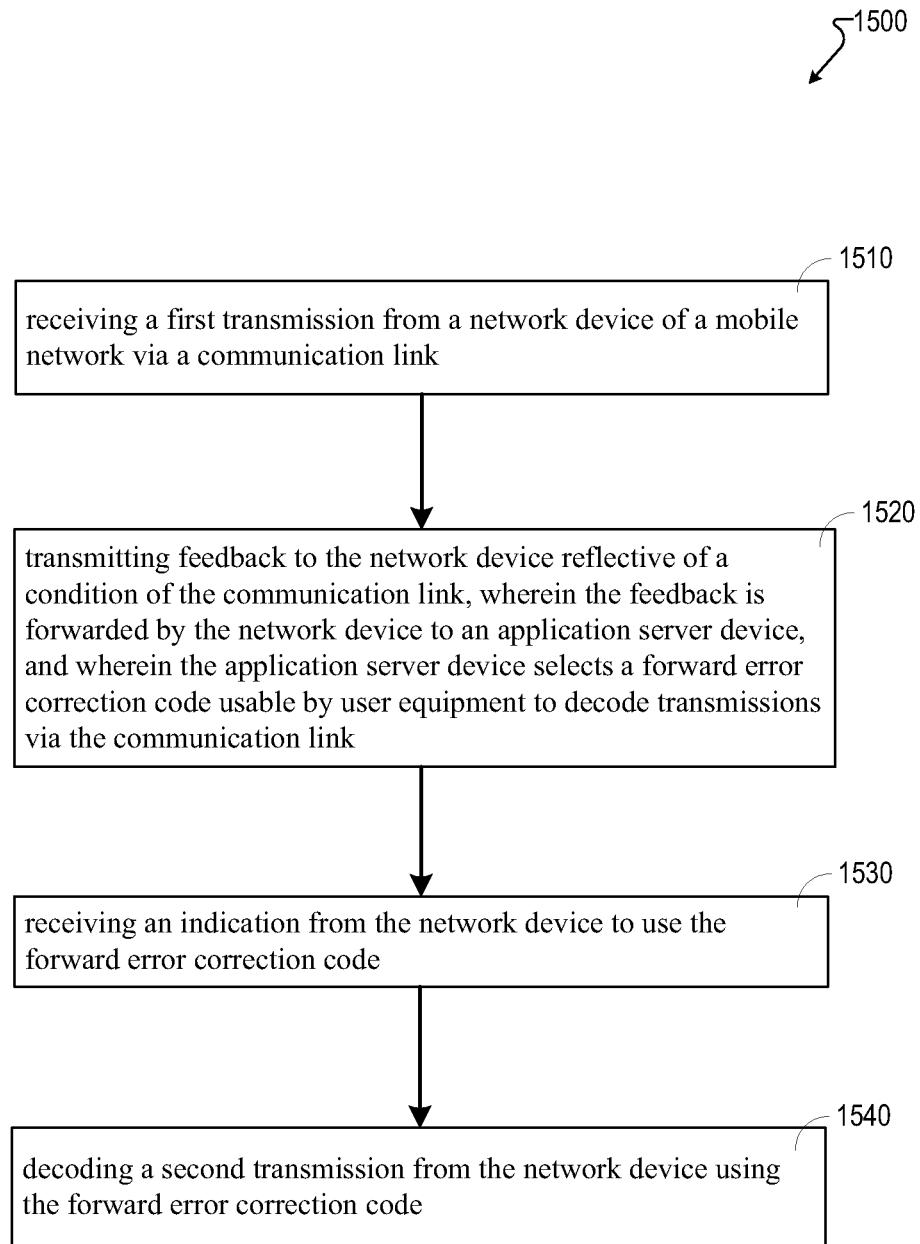
FIG. 15 illustrates another example of operations that can be performed by a C-V2X UE, in accordance with various aspects and example embodiments of the subject application.

FIG. 15 illustrates a flow diagram of example operations 1500 that can be performed, for example, by a user equipment (e.g., C-V2X UE 505) comprising a processor and a memory (e.g., a machine-readable storage medium) that stores executable instructions (e.g., software, and in example embodiments, software that comprises middleware) that, when executed by the processor, facilitate performance of the operations described in FIG. 15. The user equipment can be in a vehicle (or be the vehicle), and can also operate in accordance with an operating standard related to connecting the moving vehicle to the mobile network (e.g., a C-V2X standard).

The example operations 1500 can at block 1510 comprise receiving a first transmission (e.g., a multicast signal comprising video data) from a network device of a mobile network (e.g., mobile network 106) via a communication link.

At block 1520, the example operations 1500 can further comprise transmitting feedback to the network device reflective of a condition of the communication link, wherein the feedback is forwarded by the network device to an application server device, and wherein the application server device selects a forward error correction code usable by user equipment to decode transmissions via the communication link. The feedback can indicate that a parameter associated with a quality of service level associated with the transmission is impacted by the condition. The quality of service level can be specified in a subscriber level agreement representative of a billing arrangement associated with a customer entity associated with the user equipment.

At block 1530, the example operations 1500 can further comprise receiving an indication from the network device to use the forward error correction code. In example embodiments, the user equipment can have stored in its memory a plurality of FEC codes, including the forward error correction code selected by the network device.

At block 1540, the example operations 1500 can further comprise decoding a second transmission from the network device using the forward error correction code.

Figure 16:
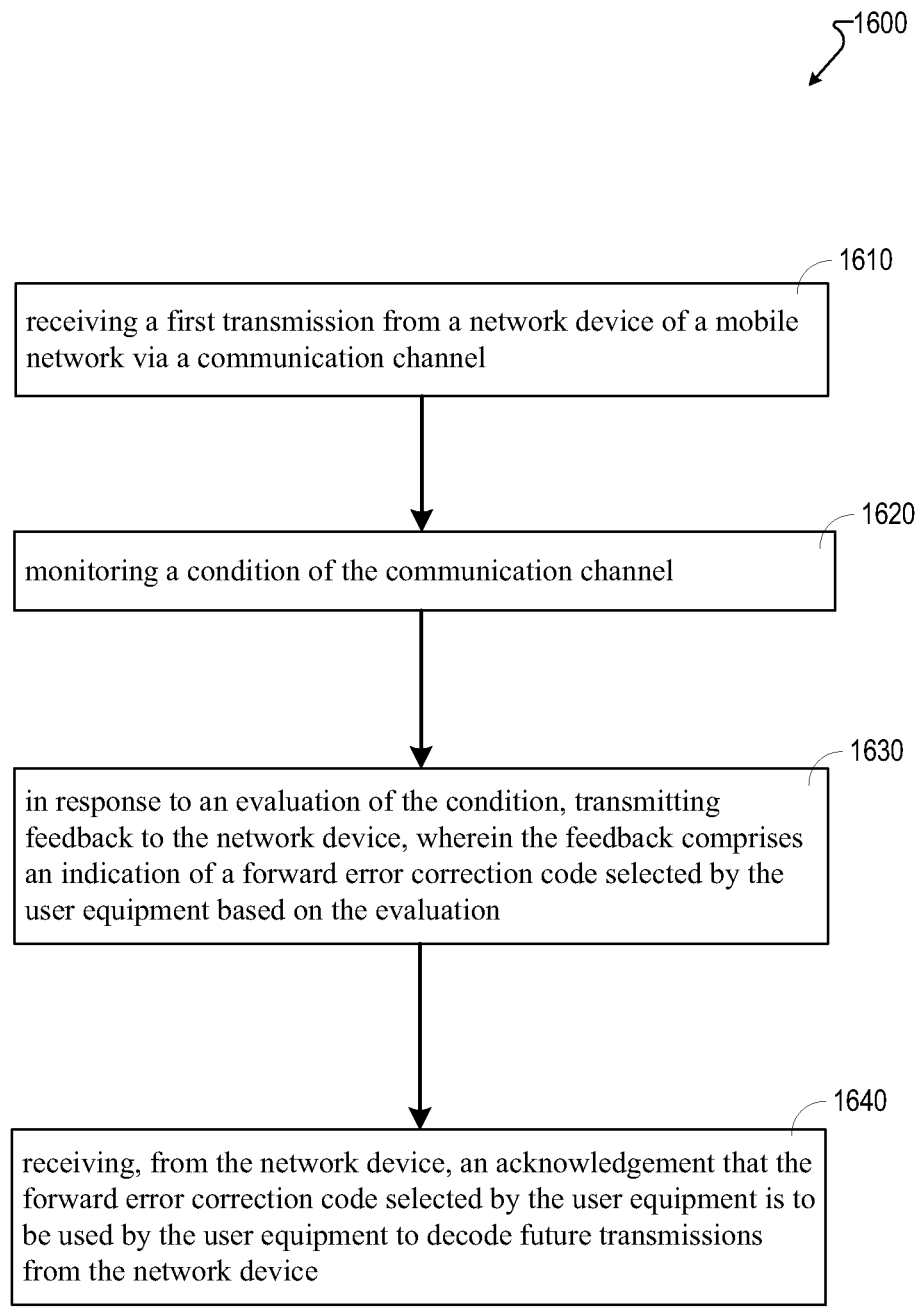
FIG. 16 illustrates another example of operations that can be performed by a C-V2X UE, in accordance with various aspects and example embodiments of the subject application.

FIG. 16 illustrates a flow diagram of example operations 1600 that can be performed, for example, by a user equipment (e.g., C-V2X UE 505) comprising a processor and a memory (e.g., a machine-readable storage medium) that stores executable instructions (e.g., software, and in example embodiments, software that comprises middleware) that, when executed by the processor, facilitate performance of the operations described in FIG. 16. The user equipment can be in a vehicle (or can be the vehicle), and can also operate in accordance with an operating standard related to connecting the moving vehicle to the mobile network (e.g., a C-V2X standard).

The example operations 1600, at block 1610, can comprise receiving a first transmission from a network device (e.g., network node 104) of a mobile network (e.g., mobile network 106) via a communication channel. The transmission can be a multicast transmission, and can comprise video data (e.g., live streaming video).

At block 1620, the example operations 1600 can further comprise monitoring a condition of the communication channel. This can entail determining a parameter related to the condition of the communication channel, such as SNR, bandwidth, packet loss, latency, errors detected, etc.

At block 1630, the example operations 1600 can further comprise, in response to an evaluation of the condition, transmitting feedback to the network device, wherein the feedback comprises an indication of a forward error correction code selected by the user equipment based on the evaluation. The feedback can then be routed through the mobile network until it reaches a C-V2X application server.

At block 1640, the example operations 1600 can comprise receiving, from the network device, an acknowledgement that the forward error correction code selected by the user equipment is to be used by the user equipment to decode future transmissions from the network device.

Figure 17:
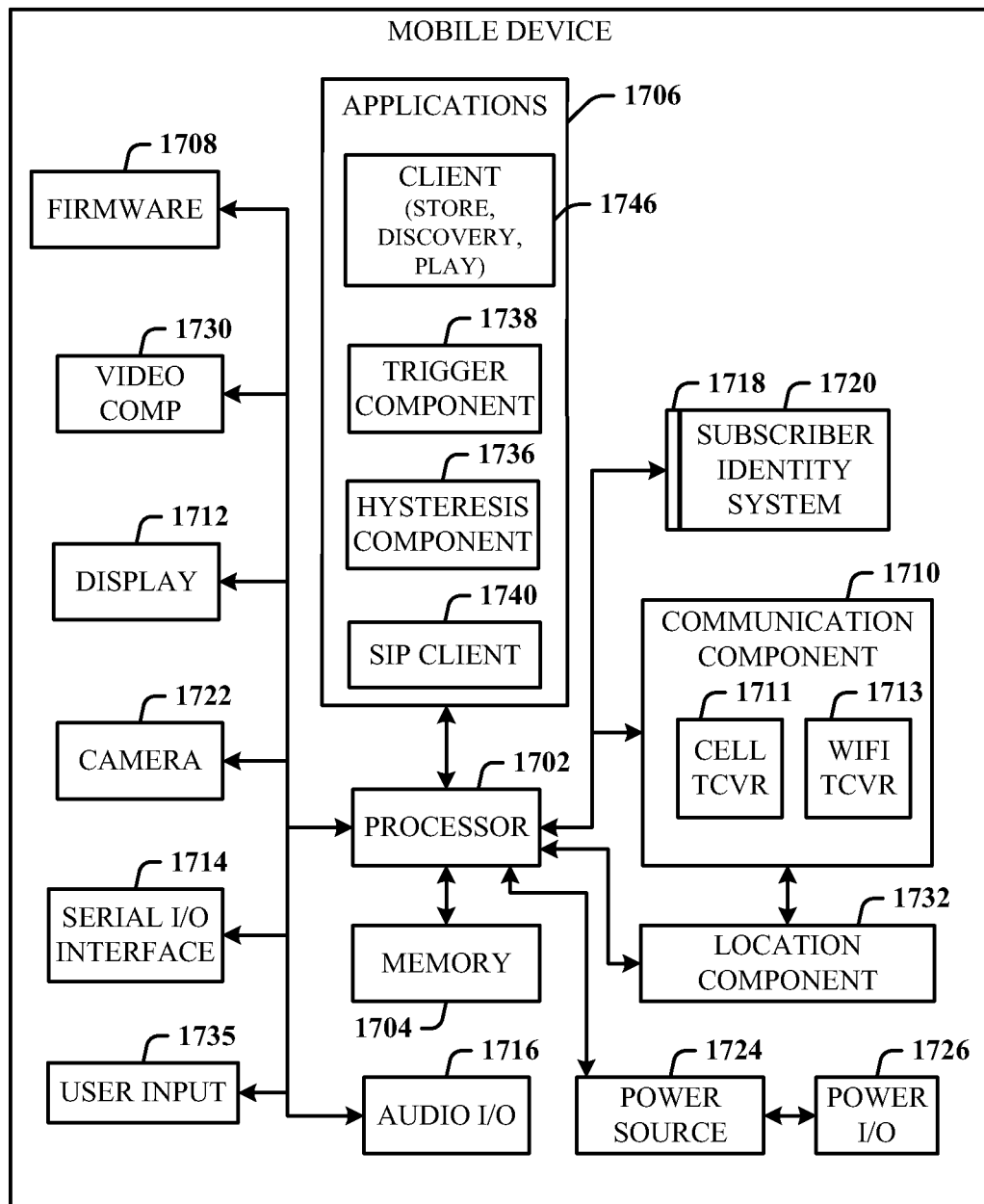
FIG. 17 illustrates an example block diagram of a mobile device that can execute processes and methods, in accordance with various aspects and embodiments of the subject application.

Referring now to FIG. 17, illustrated is a schematic block diagram of a user equipment (e.g., UE 102, etc.) that can be a mobile device 1700 (e.g., C-V2X UE 505) capable of connecting to a network in accordance with example embodiments described herein. Although a device 1700 is illustrated herein, it will be understood that the mobile device can be other devices as well, and that the mobile device 1700 is merely illustrated to provide context for the embodiments of the various embodiments described herein (e.g., C-V2X automotive vehicle). The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The mobile device 1700 includes a processor 1702 for controlling and processing all onboard operations and functions. A memory 1704 interfaces to the processor 1702 for storage of data and one or more applications 1706 (e.g., a video player software, user feedback component software, etc.). Other applications can include voice recognition of predetermined voice commands that facilitate initiation of the user feedback signals. The applications 1706 can be stored in the memory 1704 and/or in a firmware 1708, and executed by the processor 1702 from either or both the memory 1704 or/and the firmware 1708. The firmware 1708 can also store startup code for execution in initializing the mobile device 1700. A communications component 1710 interfaces to the processor 1702 to facilitate wired/wireless communication with external systems, e.g., cellular networks, VoIP networks, and so on. Here, the communications component 1710 can also include a suitable cellular transceiver 1711 (e.g., a global GSM transceiver) and/or an unlicensed transceiver 1713 (e.g., Wi-Fi, WiMax) for corresponding signal communications. The mobile device 1700 can be a device such as a cellular telephone, a PDA with mobile communications capabilities, and messaging-centric devices. The communications component 1710 also facilitates communications reception from terrestrial radio networks (e.g., broadcast), digital satellite radio networks, and Internet-based radio services networks.

The mobile device 1700 includes a display 1712 for displaying text, images, video, telephony functions (e.g., a Caller ID function), setup functions, and for user input. For example, the display 1712 can also be referred to as a "screen" that can accommodate the presentation of multimedia content (e.g., music metadata, messages, wallpaper, graphics, etc.). The display 1712 can also display videos and can facilitate the generation, editing and sharing of video quotes. A serial I/O interface 1714 is provided in communication with the processor 1702 to facilitate wired and/or wireless serial communications (e.g., USB, and/or IEEE 1394) through a hardware connection, and other serial input devices (e.g., a keyboard, keypad, and mouse). This supports updating and troubleshooting the mobile device 1700, for example. Audio capabilities are provided with an audio I/O component 1716, which can include a speaker for the output of audio signals related to, for example, indication that the user pressed the proper key or key combination to initiate the user feedback signal. The audio I/O component 1716 also facilitates the input of audio signals through a microphone to record data and/or telephony voice data, and for inputting voice signals for telephone conversations.

The mobile device 1700 can include a slot interface 1718 for accommodating a SIC (Subscriber Identity Component) in the form factor of a card Subscriber Identity Module (SIM) or universal SIM 1720, and interfacing the SIM card 1720 with the processor 1702. However, it is to be appreciated that the SIM card 1720 can be manufactured into the mobile device 1700, and updated by downloading data and software.

The mobile device 1700 can process IP data traffic through the communications component 1710 to accommodate IP traffic from an IP network such as, for example, the Internet, a corporate intranet, a home network, a person area network, etc., through an ISP or broadband cable provider. Thus, VoIP traffic can be utilized by the mobile device 1700 and IP-based multimedia content can be received in either an encoded or decoded format.

A video processing component 1722 (e.g., a camera) can be provided for decoding encoded multimedia content. The video processing component 1722 can aid in facilitating the generation, editing and sharing of video quotes. The mobile device 1700 also includes a power source 1724 in the form of batteries and/or an AC power subsystem, which power source 1724 can interface to an external power system or charging equipment (not shown) by a power I/O component 1726.

The mobile device 1700 can also include a video component 1730 for processing video content received and, for recording and transmitting video content. For example, the video component 1730 can facilitate the generation, editing and sharing of video quotes. A location tracking component 1732 facilitates geographically locating the mobile device 1700. As described hereinabove, this can occur when the user initiates the feedback signal automatically or manually. A user input component 1734 facilitates the user initiating the quality feedback signal. The user input component 1734 can also facilitate the generation, editing and sharing of video quotes. The user input component 1734 can include such conventional input device technologies such as a keypad, keyboard, mouse, stylus pen, and/or touch screen, for example.

Referring again to the applications 1706, a hysteresis component 1736 facilitates the analysis and processing of hysteresis data, which is utilized to determine when to associate with the access point. A software trigger component 1738 can be provided that facilitates triggering of the hysteresis component 1738 when the Wi-Fi transceiver 1713 detects the beacon of the access point. A SIP client 1740 enables the mobile device 1700 to support SIP protocols and register the subscriber with the SIP registrar server. The applications 1706 can also include a client 1742 that provides at least the capability of discovery, play and store of multimedia content, for example, music.

The mobile device 1700, as indicated above related to the communications component 1710, includes an indoor network radio transceiver 1713 (e.g., Wi-Fi transceiver 1713). This function supports the indoor radio link, such as IEEE 802.11, for the mobile device 1700. The mobile device 1700 can accommodate at least satellite radio services through a mobile device that can combine wireless voice and digital radio chipsets into a single handheld device.

Figure 18:
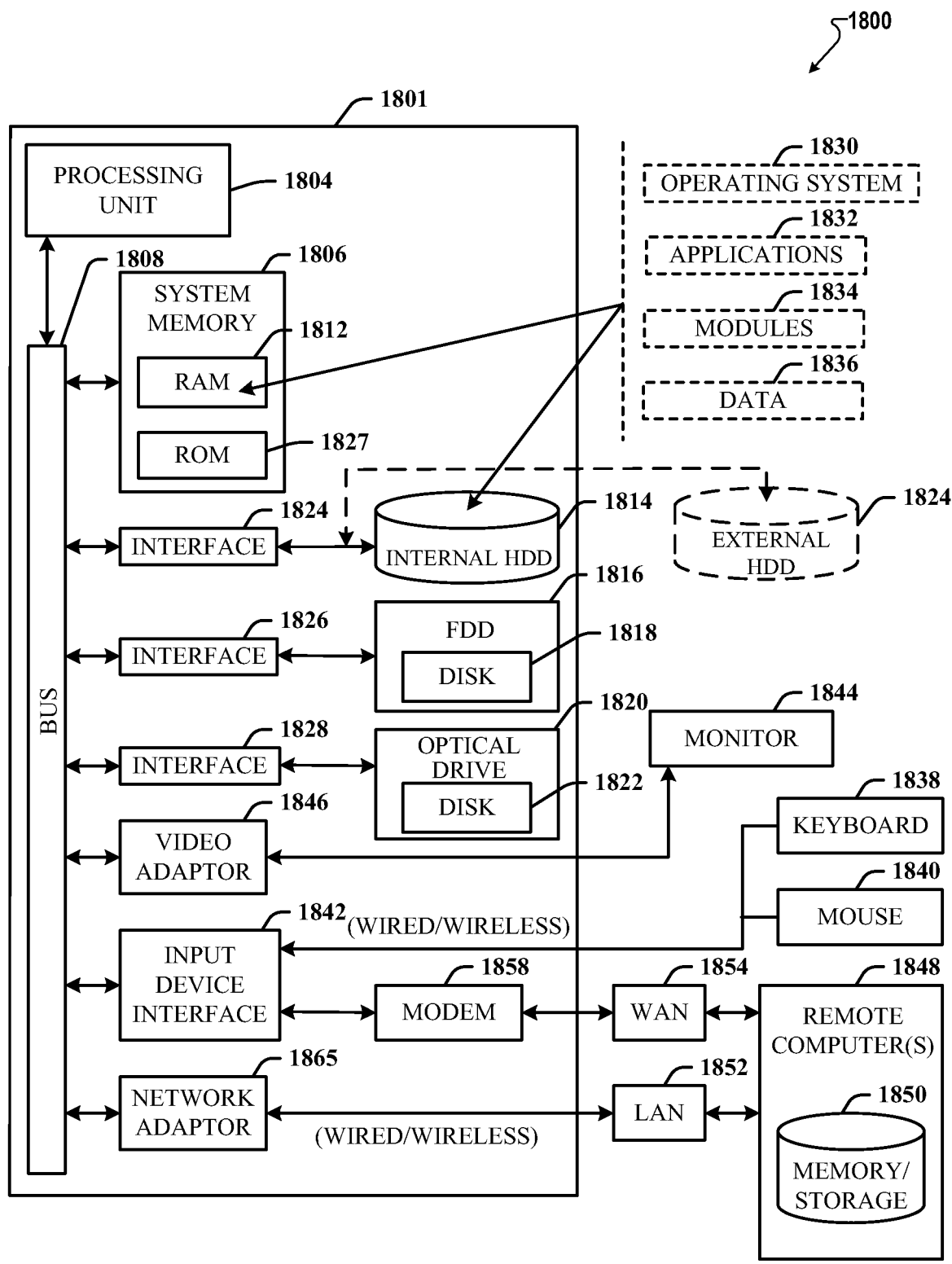
FIG. 18 illustrates an example block diagram of a computer that can execute processes and methods, in accordance with various aspects and embodiments of the subject application.

Referring now to FIG. 18, there is illustrated a block diagram of a computer 1800 that can execute the functions and operations performed in the described example embodiments. For example, network node 104, C-V2X application server 510, can contain components as described in FIG. 18. The computer 1800 can provide networking and communication capabilities between a wired or wireless communication network and a server and/or communication device. In order to provide additional context for various aspects thereof, FIG. 18 and the following discussion are intended to provide a brief, general description of a suitable computing environment in which the various aspects of the embodiments can be implemented to facilitate the functions and operations described herein. While the description above is in the general context of computer-executable instructions that can run on one or more computers, those skilled in the art will recognize that the embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 18, implementing various aspects described herein, devices can include a computer 1800, the computer 1800 comprising a processing unit 1804, a system memory 1806 and a system bus 1808. The system bus 1808 couples system components comprising the system memory 1806 to the processing unit 1804. The processing unit 1804 can be any of various commercially available processors. Dual microprocessors and other multi-processor architectures can also be employed as the processing unit 1804.

The system bus 1808 can be any of several types of bus structure that can further interconnect to a memory bus (with or without a memory controller), a peripheral bus, and a local bus using any of a variety of commercially available bus architectures. The system memory 1806 comprises read-only memory (ROM) 1827 and random access memory (RAM) 1812. A basic input/output system (BIOS) is stored in a non-volatile memory 1827 such as ROM, EPROM, EEPROM, which BIOS contains the basic routines that help to transfer information between elements within the computer 1800, such as during start-up. The RAM 1812 can also include a high-speed RAM such as static RAM for caching data.

The computer 1800 further comprises an internal hard disk drive (HDD) 1814 (e.g., EIDE, SATA), which internal hard disk drive 1814 can also be configured for external use in a suitable chassis (not shown), a magnetic floppy disk drive (FDD) 1816, (e.g., to read from or write to a removable diskette 1818) and an optical disk drive 1820, (e.g., reading a CD-ROM disk 1822 or, to read from or write to other high capacity optical media such as the DVD). The hard disk drive 1814, magnetic disk drive 1816 and optical disk drive 1820 can be connected to the system bus 1808 by a hard disk drive interface 1824, a magnetic disk drive interface 1826 and an optical drive interface 1828, respectively. The interface 1824 for external drive implementations comprises at least one or both of Universal Serial Bus (USB) and IEEE 1294 interface technologies. Other external drive connection technologies are within contemplation of the subject embodiments.

The drives and their associated computer-readable media provide nonvolatile storage of data, data structures, computer-executable instructions, and so forth. For the computer 1800 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1800, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1812, comprising an operating system 1830, one or more application programs 1832, other program modules 1834 and program data 1836. All or portions of the operating system, applications, modules, and/or data can also be cached in the RAM 1812. It is to be appreciated that the embodiments can be implemented with various commercially available operating systems or combinations of operating systems.

A user can enter commands and information into the computer 1800 through one or more wired/wireless input devices, e.g., a keyboard 1838 and a pointing device, such as a mouse 1840. Other input devices (not shown) can include a microphone, an IR remote control, a joystick, a game pad, a stylus pen, touch screen, remote terminal, or the like. These and other input devices are often connected to the processing unit 1804 through an input device interface 1842 that is coupled to the system bus 1808, but can be connected by other interfaces, such as a parallel port, an IEEE 2394 serial port, a game port, a USB port, an IR interface, etc.

A monitor 1844 or other type of display device can be connected to the system bus 1808 through an interface, such as a video adapter 1846. In addition to the monitor 1844, the computer 1800 can comprise other peripheral output devices (not shown), such as speakers, printers, etc.

The computer 1800 can operate in a networked environment using logical connections by wired and/or wireless communications to one or more remote computers, such as a remote computer(s) 1848. The remote computer(s) 1848 can be a workstation, a server computer, a router, a personal computer, portable computer, microprocessor-based entertainment device, a peer device or other common network node, and typically comprises many, if not all of, the elements described relative to the computer, although, for purposes of brevity, only a memory/storage device 1850 is illustrated. The logical connections depicted include wired/wireless connectivity to a local area network (LAN) 1852 and/or larger networks, e.g., a wide area network (WAN) 1854. Such LAN and WAN networking environments are commonplace in offices and companies, and facilitate enterprise-wide computer networks, such as intranets, all of which can connect to a global communications network, e.g., the Internet.

When used in a LAN networking environment, the computer 1800 is connected to the local network 1852 through a wired and/or wireless communication network interface or adapter 1856. The adapter 1856 can facilitate wired or wireless communication to the LAN 1852, which can also include a wireless access point disposed thereon for communicating with the wireless adapter 1856.

When used in a WAN networking environment, the computer 1800 can include a modem 1858, or is connected to a communications server on the WAN 1854, or has other means for establishing communications over the WAN 1854, such as by way of the Internet. The modem 1858, which can be internal or external and a wired or wireless device, is connected to the system bus 1808 through the input device interface 1842. In a networked environment, program modules depicted relative to the computer, or portions thereof, can be stored in the remote memory/storage device 1850. It will be appreciated that the network connections shown are exemplary and other means of establishing a communications link between the computers can be used.

The computer can communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. These components also can execute from various computer readable storage media comprising various data structures stored thereon. The components can communicate via local and/or remote processes such as in accordance with a signal comprising one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive);

and/or a virtual device that emulates a storage device and/or any of the above computer-readable media.

As it employed in the subject specification, the term "processor" can refer to substantially any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of UE. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (comprising a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprises a system as well as a computer-readable medium comprising computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary," where used, is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature can be combined with one or more other features of the other implementations as may be desired and advantageous for any given or particular application. Furthermore, to the extent that the terms "have", "having", "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art can recognize that other embodiments comprising modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A method, comprising:
   receiving, by a user equipment comprising a processor, a transmission from a network device of a mobile network via a communication channel, wherein the receiving the transmission comprises receiving video data;
   decoding, by the user equipment, the transmission using a first forward error correction code;
   determining, by the user equipment, an attribute of the transmission to determine a condition of the communication channel;
   based on the condition of the communication channel, facilitating, by the user equipment, transmitting feedback to the network device, wherein the feedback is forwarded by the network device to an application server device that selects a second forward error correction code based on the feedback; and
   receiving, by the user equipment from the network device, the second forward error correction code.

2. The method of claim 1, wherein the attribute relates to a quality of service.

3. The method of claim 1, wherein the attribute relates to a physical condition of the communication channel.

4. The method of claim 1, wherein the facilitating the transmitting of the feedback comprises facilitating the transmitting via a unicast uplink transmission channel.

5. The method of claim 1, wherein the network device comprises a network node of a radio access network.

6. The method of claim 1, wherein the receiving the transmission comprises receiving a multicast signal.

7. A device, comprising:
   a processor; and
   a memory that stores executable instructions that, when executed by the processor, facilitate performance of operations, comprising:
   receiving a transmission from a network device of a mobile network via a communication channel, wherein the receiving the transmission comprises receiving video data;
   monitoring a condition of the communication channel;
   in response to a determination as a result of the monitoring that the condition warrants an adjustment to a first forward error correction code used to decode the transmission, transmitting feedback to the network device, wherein the feedback is forwarded by the network device to an application server device that selects a second forward error correction code based on the feedback; and
   receiving, from the network device, the second forward error correction code.

8. The device of claim 7, wherein the monitoring the condition comprises determining an attribute related to a quality of service.

9. The device of claim 8, wherein the quality of service is determined by a subscriber level agreement.

10. The device of claim 7, wherein the transmitting the feedback comprises transmitting the feedback via a unicast uplink transmission channel.

11. The device of claim 7, wherein the receiving the transmission comprises receiving a multicast signal.

12. The device of claim 7, wherein the user equipment is an automotive vehicle.

13. The device of claim 12, wherein the user equipment operates in accordance with a communication standard that governs communications between the automotive vehicle and network devices of the mobile network.

14. A non-transitory machine-readable medium, comprising executable instructions that, when executed by a processor of a user equipment, facilitate performance of operations, comprising:
   receiving a first transmission from a network device of a mobile network via a communication link, wherein the receiving the first transmission comprises receiving video data;
   transmitting feedback to the network device reflective of a condition of the communication link, wherein the feedback is forwarded by the network device to an application server device, and wherein the application server device selects a forward error correction code usable by user equipment to decode transmissions via the communication link;
   receiving an indication from the network device to use the forward error correction code; and decoding a second transmission from the network device using the forward error correction code.

15. The non-transitory machine-readable medium of claim 14, wherein the user equipment comprises an automotive vehicle.

16. The non-transitory machine-readable medium of claim 15, wherein the user equipment operates in accordance with a communication standard associated with communications between the automotive vehicle and the mobile network.

17. The non-transitory machine-readable medium of claim 14, wherein the feedback indicates a parameter associated with a quality of service level associated with the transmission is impacted by the condition.

18. The non-transitory machine-readable medium of claim 17, wherein the quality of service is determined by a subscriber level agreement.

19. The method of claim 1, wherein the user equipment comprises an automotive vehicle.

20. The method of claim 19, wherein the user equipment operates in accordance with a communication standard associated with communications between the automotive vehicle and the mobile network.

\* \* \* \* \*